United States Patent
Scarinci et al.

(10) Patent No.: US 10,415,936 B2
(45) Date of Patent: Sep. 17, 2019

(54) ARMOR MOUNTING SYSTEM AND ARMOR INCORPORATING THE SAME

(71) Applicant: PPG Industries Ohio, Inc., Pittsburgh, PA (US)

(72) Inventors: Carlo A. Scarinci, Bakersfield, CA (US); David Palermo, Pittsburgh, PA (US)

(73) Assignee: PPG INDUSTRIES OHIO, INC., Pittsburgh, PA (US)

( * ) Notice: Subject to any disclaimer, the term of this patent is extended or adjusted under 35 U.S.C. 154(b) by 0 days.

(21) Appl. No.: 14/585,099

(22) Filed: Dec. 29, 2014

(65) Prior Publication Data

US 2015/0300784 A1    Oct. 22, 2015

Related U.S. Application Data

(60) Provisional application No. 61/922,367, filed on Dec. 31, 2013.

(51) Int. Cl.
*F41H 7/04* (2006.01)
*B29C 65/48* (2006.01)
(Continued)

(52) U.S. Cl.
CPC .............. *F41H 7/04* (2013.01); *B29C 65/02* (2013.01); *B29C 65/48* (2013.01); *F41H 5/013* (2013.01);
(Continued)

(58) Field of Classification Search
CPC ...... F41H 5/013; F41H 5/0407; F41H 5/0421; F41H 5/0428; F41H 5/0457; F41H 7/04;
(Continued)

(56) References Cited

U.S. PATENT DOCUMENTS

| 2,410,022 A | 10/1946 | Dumais |
| 2,991,209 A | 7/1961 | Worrall |

(Continued)

FOREIGN PATENT DOCUMENTS

| CA | 2111781 A1 | 6/1995 |
| CO | 93415969 | 6/1992 |

(Continued)

OTHER PUBLICATIONS

PCT Search Report and Written Opinion for Application No. PCT/US2014/072608, dated Sep. 17, 2015; 11 pages.
(Continued)

*Primary Examiner* — Bret Hayes
(74) *Attorney, Agent, or Firm* — Lewis Roca Rothgerber Christie LLP

(57) ABSTRACT

A modular armor system configured to be readily attached and detached from a frame surrounding a window in a vehicle or other structure, such as a building. The modular armor system may be configured to provide any desired ballistics protection rating. In one embodiment, the modular armor system includes a ballistics-grade armor panel having an outer strike face and an inner surface opposite the outer strike face. The modular armor system also includes a fastener coupled to the ballistics-grade armor panel. The fastener is configured to detachably couple the ballistics-grade armor panel to the frame surrounding the window in the vehicle or other structure.

33 Claims, 9 Drawing Sheets

(51) Int. Cl.
  *B29C 65/02* (2006.01)
  *F41H 5/04* (2006.01)
  *F41H 5/013* (2006.01)
  *B29K 75/00* (2006.01)
  *B29L 31/30* (2006.01)
  *B29L 31/00* (2006.01)

(52) U.S. Cl.
  CPC ......... *F41H 5/0407* (2013.01); *F41H 5/0421* (2013.01); *F41H 5/0428* (2013.01); *F41H 5/0457* (2013.01); *B29K 2075/00* (2013.01); *B29L 2031/3005* (2013.01); *B29L 2031/768* (2013.01)

(58) Field of Classification Search
  CPC ... B29C 65/02; B29C 65/48; B29L 2031/768; B29L 2031/3005; B29K 2075/00
  USPC ........... 89/36.01, 36.02, 36.07, 36.08, 36.09, 89/36.11, 36.12, 937
  See application file for complete search history.

(56) References Cited

U.S. PATENT DOCUMENTS

| | | |
|---|---|---|
| 3,380,406 A | 4/1968 | Gosnell |
| 3,624,238 A | 11/1971 | McKenzie |
| 3,776,094 A | 12/1973 | Gilles et al. |
| 4,081,581 A | 3/1978 | Littell, Jr. |
| 4,550,044 A | 10/1985 | Rosenberg et al. |
| 4,716,810 A | 1/1988 | DeGuvera |
| 4,932,608 A | 6/1990 | Heidish et al. |
| 5,002,820 A | 3/1991 | Bolton et al. |
| 5,032,466 A | 7/1991 | Cappa |
| 5,217,185 A * | 6/1993 | Rucker ............... B64G 1/58 244/121 |
| 5,229,204 A | 7/1993 | Labock |
| 5,271,311 A | 12/1993 | Madden, Jr. |
| 5,377,577 A * | 1/1995 | Bounkong ............ F41H 5/08 2/2.5 |
| 5,398,592 A | 3/1995 | Turner |
| 5,594,193 A | 1/1997 | Sheridan |
| 5,619,748 A * | 4/1997 | Nelson ............. F41H 5/0478 2/2.5 |
| 5,641,934 A * | 6/1997 | Follett ............. F41H 5/0407 89/36.05 |
| 5,668,344 A | 9/1997 | Bornstein |
| 5,670,734 A | 9/1997 | Middione et al. |
| 5,723,807 A | 3/1998 | Kuhn, II |
| 5,926,842 A * | 7/1999 | Price ............... F41H 5/0478 2/2.5 |
| 5,939,658 A | 8/1999 | Muller |
| 6,047,399 A * | 4/2000 | Bachner, Jr. ....... F41H 5/0485 2/2.5 |
| 6,127,291 A * | 10/2000 | Coppage, Jr. ..... F41H 5/0485 2/2.5 |
| 6,129,974 A | 10/2000 | Woll |
| 6,327,954 B1 | 12/2001 | Medlin |
| 6,546,692 B1 | 4/2003 | Duncan et al. |
| 6,559,079 B1 * | 5/2003 | Bachner, Jr. ....... F41H 5/0485 2/2.5 |
| 6,569,787 B1 | 5/2003 | Snelling |
| 6,708,595 B1 | 3/2004 | Chaussade et al. |
| 6,818,268 B2 | 11/2004 | Gonzalez |
| 7,225,717 B2 | 6/2007 | Williams |
| 7,493,844 B2 * | 2/2009 | Martin ............. F41H 5/0407 89/36.01 |
| 7,540,228 B1 * | 6/2009 | Cronin ............. F41H 5/0421 2/2.5 |
| 7,698,985 B2 | 4/2010 | Tapp et al. |
| 7,823,498 B2 | 11/2010 | Schneider et al. |
| 7,854,190 B2 | 12/2010 | Speyer |
| 8,088,462 B1 | 1/2012 | Cockman et al. |
| 8,088,472 B2 | 1/2012 | Mannheim Astete et al. |
| 8,267,003 B1 * | 9/2012 | Lou ................. F41H 5/013 89/36.08 |
| 8,291,657 B2 * | 10/2012 | White ............... E06B 5/106 109/49.5 |
| 8,689,671 B2 | 4/2014 | Hummel et al. |
| 8,739,312 B1 * | 6/2014 | Brown .............. F41H 1/02 2/2.5 |
| 8,763,512 B2 | 7/2014 | Terrenzi et al. |
| 8,906,484 B1 | 12/2014 | Black, Jr. et al. |
| 9,040,160 B2 | 5/2015 | Carberry et al. |
| 9,532,447 B2 | 12/2016 | Ohata |
| 2001/0032540 A1 | 10/2001 | Gourio |
| 2004/0016036 A1 * | 1/2004 | Bachner, Jr. ....... F41H 5/0485 2/2.5 |
| 2005/0087064 A1 | 4/2005 | Cohen |
| 2006/0252328 A1 | 11/2006 | Bingenheimer |
| 2008/0187721 A1 | 8/2008 | Engl |
| 2008/0271652 A1 | 11/2008 | White et al. |
| 2009/0047453 A1 | 2/2009 | Folaron |
| 2009/0282968 A1 | 11/2009 | Colliflower et al. |
| 2010/0077913 A1 | 4/2010 | Cunningham |
| 2011/0084521 A1 * | 4/2011 | Shellenberger ....... B60J 1/007 296/193.08 |
| 2011/0185884 A1 | 8/2011 | Kruger et al. |
| 2012/0103178 A1 | 5/2012 | Dijkman |
| 2012/0160084 A1 | 6/2012 | Mosser |
| 2012/0204711 A1 | 8/2012 | Engleman et al. |
| 2013/0284339 A1 | 10/2013 | Cellaruis et al. |
| 2014/0060306 A1 | 3/2014 | Bertolini |
| 2014/0144313 A1 | 5/2014 | Bertolini |
| 2014/0261108 A1 * | 9/2014 | Tunis, III ........... E05G 1/026 109/38 |
| 2015/0024165 A1 | 1/2015 | Glide et al. |
| 2015/0114211 A1 | 4/2015 | Medwell et al. |
| 2015/0211830 A1 | 7/2015 | Xu |
| 2015/0268007 A1 | 9/2015 | Bergman et al. |
| 2015/0268009 A1 | 9/2015 | Tunis, III et al. |
| 2015/0292838 A1 | 10/2015 | Shoshan et al. |
| 2015/0300784 A1 | 10/2015 | Scarinci et al. |
| 2016/0152015 A1 | 6/2016 | Unvericht et al. |
| 2016/0265882 A1 | 9/2016 | Singletary et al. |

FOREIGN PATENT DOCUMENTS

| | | |
|---|---|---|
| DE | 4230073 A1 | 3/1994 |
| DE | 4415879 A1 | 11/1995 |
| DE | 10043793 A1 | 3/2002 |
| DE | 10244368 A1 | 4/2004 |
| DE | 102009060923 A1 | 8/2011 |
| EP | 1 361 408 A1 | 11/2003 |
| EP | 1916496 A1 | 4/2008 |
| EP | 2 505 953 A1 | 10/2012 |
| WO | WO 2005045351 A1 | 5/2005 |
| WO | WO 2008127272 A1 | 10/2008 |
| WO | WO 2008140480 A1 | 11/2008 |
| WO | WO 2009/045243 | 4/2009 |
| WO | WO 2012/052944 | 4/2012 |

OTHER PUBLICATIONS

Office action (and English translation) issued in corresponding Colombian Application No. NC2016/0000519, dated Aug. 24, 2017, 21 pages.

Office action issued in corresponding European Application No. 14879268.2, dated Jul. 19, 2017, 6 pages.

Office action issued in corresponding European Application No. 14879268.2, dated Mar. 19, 2018, 6 pages.

English translation of previously cited Office action issued in corresponding Colombian Application No. NC2016/0000519, dated Mar. 27, 2018, 16 pages.

Office action issued in corresponding European Application No. 14879268.2, dated Nov. 6, 2018, 5 pages.

(56) References Cited

OTHER PUBLICATIONS

English translation of Resolution action issued in corresponding Colombian Application No. NC2016/0000519, dated Sep. 18, 2018, 17 pages.

* cited by examiner

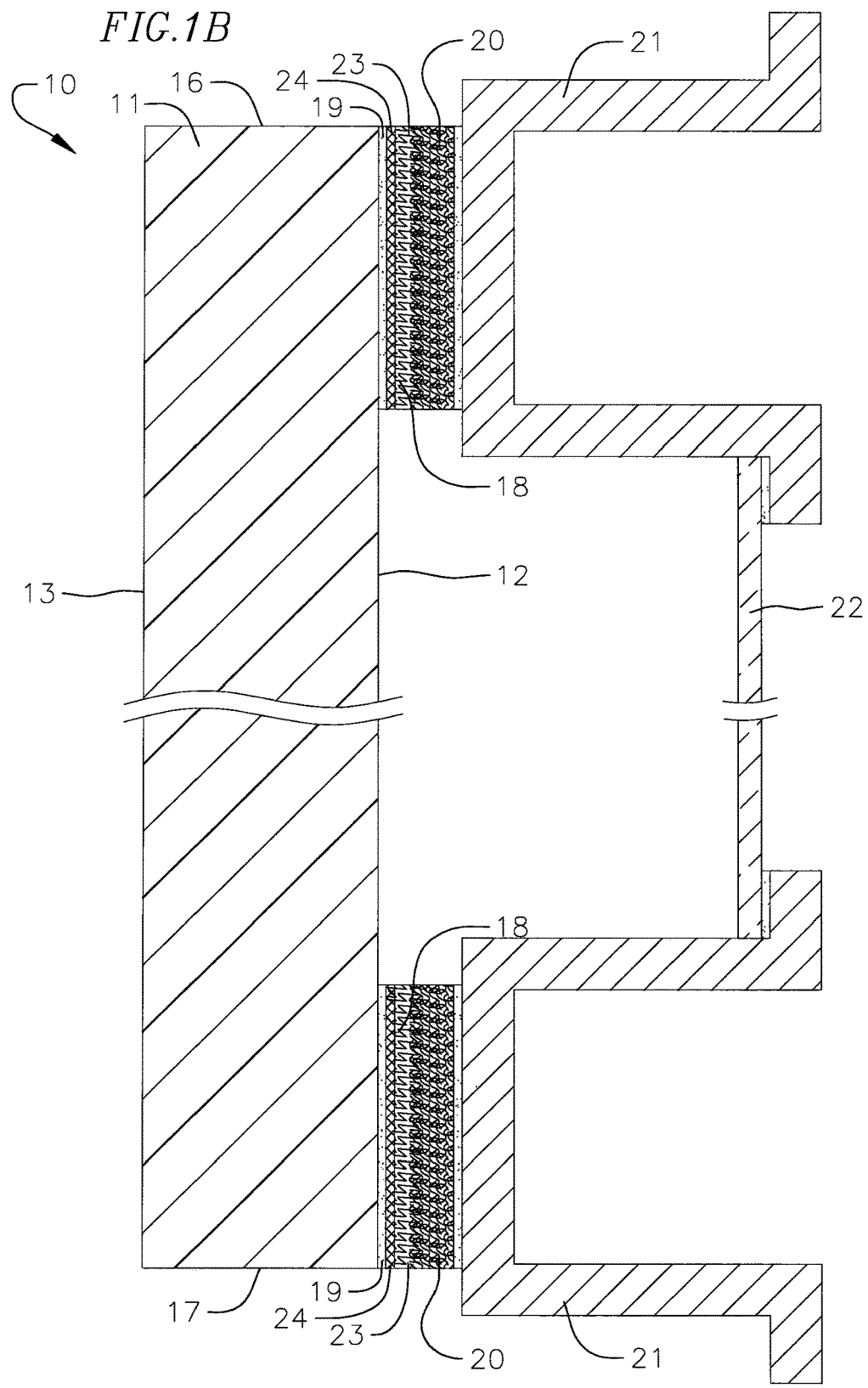

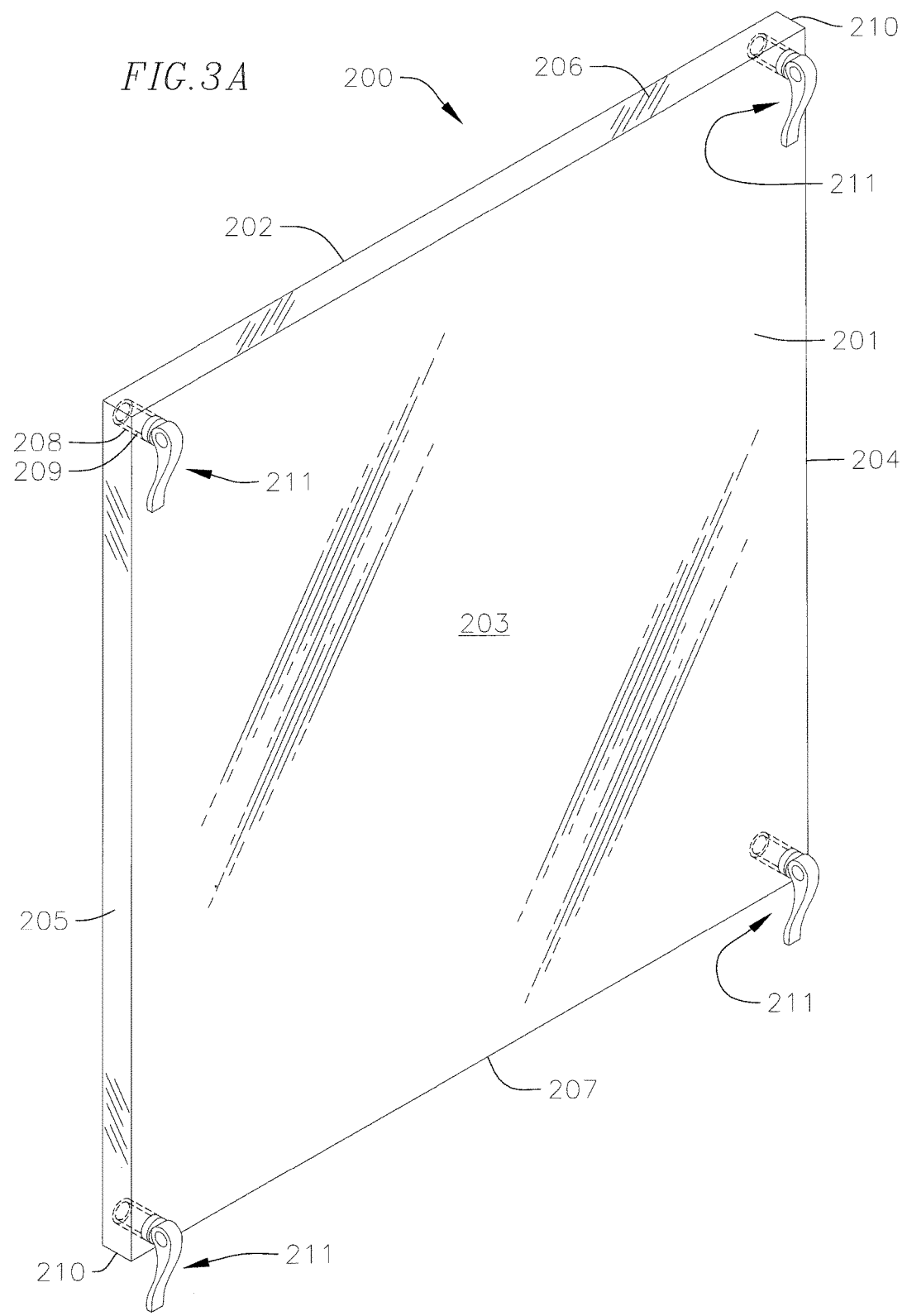

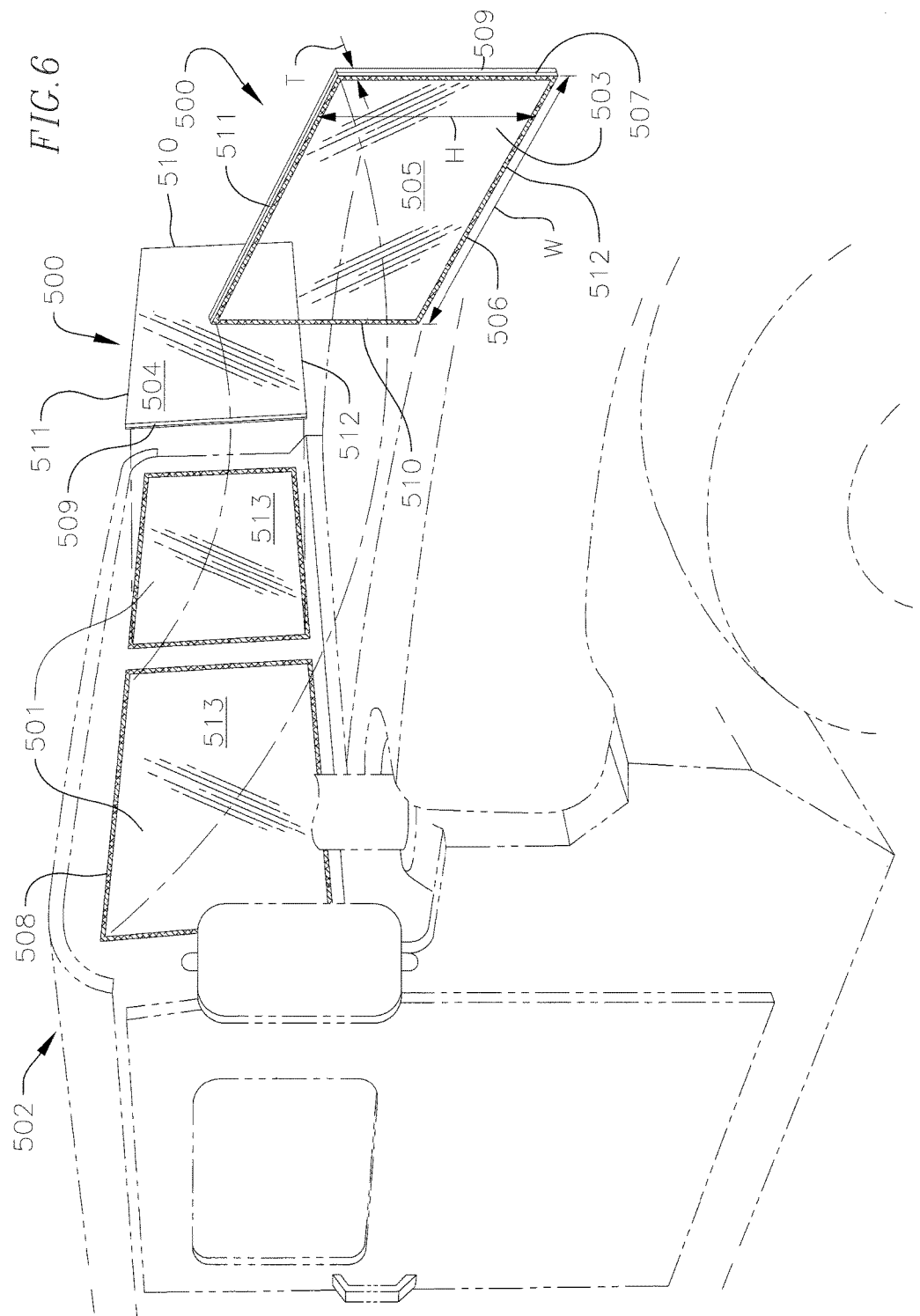

ARMOR MOUNTING SYSTEM AND ARMOR INCORPORATING THE SAME

CROSS-REFERENCE TO RELATED APPLICATION

This application claims the benefit of and priority to U.S. Provisional Application No. 61/922,367, filed Dec. 31, 2013, the entire content of which is incorporated herein by reference.

FIELD

The present disclosure relates generally to ballistics protection apparatuses, and more particularly to a modular armor system.

BACKGROUND

Armor panels are widely used to protect vehicles (e.g., land assault vehicles, personnel carriers, aircraft, naval ships) and other structures (e.g., buildings, bunkers, barricades) against ballistics, such as projectiles and shrapnel, and percussive waves, such as from nearby explosions. Conventional armor panels are either permanently integrated into the vehicles or other structure or semi-permanently attached to the vehicle or other structure. Typically, conventional armor panels are either bolted through holes in the vehicle or structure or mounted within c-channel members attached to the vehicle or other structure. Accordingly, it may be difficult and time-consuming to install conventional armor panels. The difficult and time-consuming nature of installing conventional armor panels also adds to the overall cost of the vehicle, which may limit the number of vehicles that receive armor protection. Additionally, conventional armor panels are not readily removable from vehicles or other structures. Thus, vehicles may remain equipped with conventional armor panels even when the vehicle is not in a combat zone, thereby unnecessarily reducing the maneuverability and fuel efficiency of the vehicle. Moreover, due to the permanent or semi-permanent installation of conventional armor panels, conventional armor panels are not easily salvaged for reuse in new vehicles or other structures.

SUMMARY

The present disclosure is directed to various embodiments of modular armor systems configured to be readily attached and detached from a vehicle or other structure. In one embodiment, the modular armor system includes a ballistics-grade armor panel having an outer strike face and an inner surface opposite the outer strike face and fastener coupled to the ballistics-grade armor panel. The fastener is configured to detachably couple the ballistics-grade armor panel to a structure, such as a frame surrounding a window in a vehicle or a building. In one embodiment, the ballistics-grade armor panel is a transparent material, such as glass, interlayer, acrylic, polycarbonate, plastic, transparent ceramic, ionomers, ionoplasts, or any combinations thereof. In one embodiment, the fastener is coupled to the ballistics-grade armor panel by a layer of adhesive, such as polyurethane. In another embodiment, the ballistics-grade armor panel is an opaque material, such as metal, metal alloy, ceramic, composite, synthetic fibers, or any combinations thereof. In one embodiment, the fastener includes a hook or loop type fastening member coupled to the outer strike face of the armor panel. In one embodiment, the modular armor system includes a step in the ballistics-grade armor panel extending inward from the outer strike face and the fastener includes a plurality of hook or loop type fastening tabs coupled to the step and overhanging edges of the ballistics-grade armor panel. The material and thickness of the armor panel may be configured to provide any desired ballistics protection level, such as a level of ballistics protection in conformity with one or more of the standards promulgated by the National Institute of Justice ("NIJ") (e.g., NIJ Level I to IV or NIJ Standard 0108.01), the Home Office Scientific Development Branch (HOSDB), NATO Standardization Agreement ("STANAG") (e.g., STANAG AEP 55, Volume 1), Underwriters Laboratory ("UL") (e.g., UL-752), EuroNorm (e.g., EuroNorm 1063), Association of Test Laboratories for Bullet Resistant Materials and Constructions (VPAM) (e.g., VPAM APR 2006), and/or any custom criteria.

The present disclosure is also directed to various embodiments of an armored vehicle. In one embodiment, the armored vehicle includes a vehicle having an interior cabin, a window having an outer surface and an inner surface facing the interior cabin of the vehicle, and a frame surrounding the at least one window. The armored vehicle also includes a modular armor system configured to be detachably coupled to the frame of the vehicle. The modular armor system includes a ballistics-grade armor panel having an outer strike face and an inner surface opposite the outer strike face. The outer strike face of the ballistics-grade armor panel is disposed between the inner surface of the window and the inner surface of the ballistics-grade armor panel. In one embodiment, the armored vehicle includes a first fastener coupled to the frame of the vehicle and a second fastener coupled to the outer strike face of the ballistics-grade armor panel. The second fastener is configured to be detachably coupled to the first fastener. In one embodiment, the first fastener is either a hook or loop type fastening mechanism, and the second fastener is a corresponding loop or hook type fastening mechanism. In another embodiment, the first fastener is either a knob bracket or a latch assembly and the second fastener is the other of a knob bracket or a latch assembly. In one embodiment, the armored vehicle also includes at least one opening extending through the ballistics-grade armor panel, a bushing received in each of the openings, and a quick-release mechanism coupled to the frame and extending through each bushing. The quick-release mechanism detachably couples the ballistics-grade armor panel to the frame of the vehicle.

In one embodiment, the armored vehicle includes a step in the ballistics-grade armor panel extending inward from the outer strike face. The step receives at least a portion of the frame of the vehicle. The armored vehicle also includes a series of hook or loop type fastening tabs coupled to the step and overhanging edges of the ballistics-grade armor panel and at least one corresponding loop or hook type fastening member coupled to the frame of the vehicle. The hook or loop type fastening tabs are configured to be detachably coupled to the corresponding loop or hook type fastening member coupled to the frame. In one embodiment, the outer strike face of the armor panel abuts the inner surface of the window, and in another embodiment the outer strike face of the armor panel is spaced apart from the inner surface of the window.

The present disclosure is also directed to modular armor system configured to be detachably coupled to a vehicle or other structure by a quick-release mechanism. In one embodiment, the modular armor system includes a ballistics-grade armor panel having an outer strike face and an inner surface opposite the outer strike face, at least one opening extending through the ballistics-grade armor panel, a bushing received in each of the openings, and a quick-release mechanism extending through each bushing. The quick-release mechanism is configured to detachably connect the modular armor system to a vehicle or other structure. In one embodiment, the quick-release mechanism is either a quick-release skewer assembly or a push button pin assembly.

The present disclosure is also directed to a method of manufacturing a modular armor system configured to be detachably coupled to a structure. In one embodiment, the method includes laminating a fastener to a ballistics-grade armor panel with a layer of adhesive. In one embodiment, laminating the fastener to the ballistics-grade armor panel includes subjecting the layer of adhesive to an elevated temperature and an elevated pressure in an autoclave. In one embodiment, the elevated temperature is at least approximately 145° F. and the elevated pressure is at least approximately 20 psi. In one embodiment, the fastener includes a hook or loop type fastening member having a base layer and the adhesive layer is infused into the base layer of the fastener during lamination of the fastener to the ballistics-grade armor panel. In one embodiment, the adhesive layer includes a thermoplastic or thermoset material (e.g., polyurethane).

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of a modular armor system according to the present disclosure are described with reference to the following figures. The same reference numerals are used throughout the figures to reference like features and components. The figures are not necessarily drawn to scale.

FIG. 1B is a cross-sectional view of the modular armor system of FIG. 1A;

FIG. 3A is a rear perspective view of a modular armor system according to a further embodiment of the present disclosure;

FIG. 6 is an exploded perspective view of a modular armor system according to one embodiment of the present disclosure configured to be attached to a windshield of an armored vehicle.

DETAILED DESCRIPTION

The present disclosure is directed to embodiments of modular armor systems having an attachment mechanism configured to enable the modular armor systems to be readily attached and detached to a vehicle (e.g., armored assault vehicle, personnel carrier, military aircraft, or naval ship) or any other structure requiring ballistics protection, such as a building or a structural barrier (e.g., a barricade). Embodiments of the modular armor systems of the present disclosure are configured to absorb the kinetic energy of high-powered and/or low-powered projectiles striking the armor systems. Embodiments of the modular armor systems are also configured to deflect percussive energy, such as a shock wave, and thereby protect the individuals inside the building or the vehicle's cabin against nearby explosives or other concussive devices. Additionally, the modular armor systems of the present disclosure are configured to be detachably installed on the inside of the vehicle's or building's windows. Providing the modular armor systems on the insides of the windows provides ballistic protection against both munitions and shattered glass penetrating into the building or the vehicle's cabin. Alternatively, the modular armor systems of the present disclosure may be provided on the outside of the vehicle's or building's windows. The modular armor systems of the present disclosure may also be provided on non-transparent surfaces of a vehicle or other structure (e.g., the modular armor systems may be coupled to an inner and/or outer surface of an outer skin or panel of an armored vehicle). The modular armor systems of the present disclosure may be configured to provide any desired ballistics protection rating, such as, for instance, a level of ballistics protection in conformity with one or more of the standards promulgated by the National Institute of Justice ("NIJ") (e.g., NIJ Level I to IV or NIJ Standard 0108.01), the Home Office Scientific Development Branch (HOSDB), NATO Standardization Agreement ("STANAG") (e.g., STANAG AEP 55, Volume 1), Underwriters Laboratory ("UL") (e.g., UL-752), EuroNorm (e.g., EuroNorm 1063), Association of Test Laboratories for Bullet Resistant Materials and Constructions (VPAM) (e.g., VPAM APR 2006), and/or any custom criteria, by selecting the appropriate combination of materials and thicknesses, as described below.

Figure 1A:
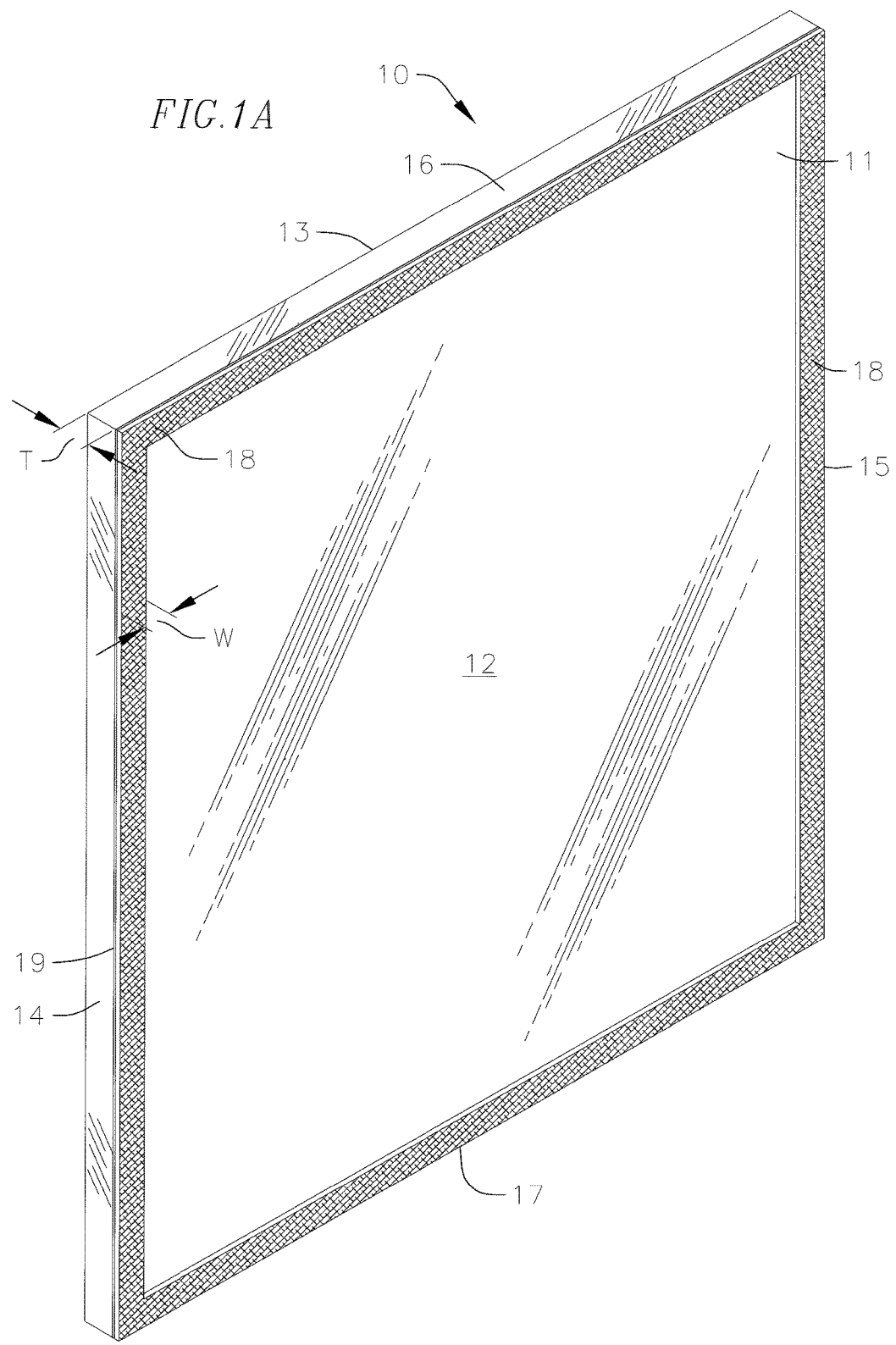
FIG. 1A is a front perspective view of a modular armor system according to one embodiment of the present disclosure.

With reference now to FIGS. 1A and 1B, a modular armor system 10 according to one embodiment of the present disclosure is illustrated. The modular armor system 10 includes a ballistics-grade armor panel 11 having an outer strike face 12 and an inner surface 13 opposite the outer strike face 12. In the illustrated embodiment, the armor panel 11 is a rectangular prism having a pair of opposing sides 14, 15 and a pair of opposing upper and lower sides 16, 17, respectively. In one or more alternate embodiments, the armor panel 11 may have any other suitable shape, such as, for instance, circular, trapezoidal, triangular, or even irregularly shaped, depending upon the shape of the windows in the vehicle or structure in which the modular armor system 10 is intended to be installed. Additionally, in one embodiment, the armor panel 11 may be configured to substantially match the shape and size of the windows in the vehicle or other structure to which the modular armor system 10 is intended to be installed. In alternate embodiments, the armor panel 11 may be smaller or larger than the windows in the vehicle or other structure.

With continued reference to the embodiment illustrated in FIGS. 1A and 1B, the modular armor system 10 also includes a hook or loop type fastening member 18 bonded to the outer strike surface 12 of the armor panel 11 with a layer of adhesive 19. In one or more alternate embodiments, the hook or loop type fastening member 18 may be coupled to the outer strike surface 12 of the armor panel 19 by any other suitable mechanism, such as, for instance, with mechanical fasteners. As illustrated in FIG. 1B, the hook or loop fastening member 18 is configured to be releasably secured to a corresponding loop or hook type fastening member 20. In the illustrated embodiment of FIG. 1B, the corresponding loop or hook type fastening member 20 is bonded to a frame 21 surrounding a window 22 in a vehicle or other structure, such as a building. Together, the hook and loop fastening members 18, 20 are configured to detachably couple the armor panel 11 to the frame 21 surrounding the window 22, thereby protecting individuals inside the building or the vehicle's cabin against projectiles striking the window 22. In one embodiment, the modular armor system 10 includes a hook type fastening member 18 and the vehicle or other structure includes a corresponding loop type fastening member 20. In an alternate embodiment, the modular armor system 10 may include a loop type fastening member 20 and the vehicle or other structure may include a corresponding hook type fastening member 18. In the illustrated embodiment of FIG. 1A, the hook or loop fastening mechanism 18 extends continuously around a periphery of the outer strike face 12 of the armor panel 11 and the corresponding loop or hook fastening member 20 extends continuously around the frame 21 surrounding the window 22. It will be appreciated, however, that the hook or loop fastening mechanism 18 may be disposed only in discrete portions of the periphery of the armor panel, such as, for example, in corners of the outer strike face 12 of the armor panel 11. Moreover, although the hook or loop fastening mechanism 18 in the illustrated embodiment is adjacent to each of the sides 14, 15, 16, 17 of the armor panel 11, in one or more alternate embodiments, the hook or loop fastening mechanism 18 may be spaced apart from the sides 14, 15, 16, 17 of the armor panel 11 by any suitable distance, such as, for instance, from approximately ½ inch to approximately 2 inches depending upon the configuration of the window. Additionally, in one or more embodiments, the hook or loop type fastening member 18 may also be coupled to one or more of the sides 14, 15, 16, 17 of the armor panel 11 and/or to the inner surface 13 of the armor panel 11 (e.g., the hook or loop type fastening member 18 may extend from the outer strike face 12, around the sides 14, 15, 16, 17 of the armor panel 11, and onto the inner surface 13 of the armor panel 11). In one embodiment, the hook or loop type fastening member 18 may extend continuously from the outer strike face 12 to the inner surface 13. In one or more embodiments the hook or loop type fastening member 18 may be include a series of discrete hook or loop type fastening members 18 on the outer strike face 12, the one or more sides 14, 15, 16, 17, and the inner surface 13. The hook or loop type fastening member 18 may be coupled to one or more of the sides 14, 15, 16, 17 and/or to the inner surface 13 of the armor panel 11 in the same or similar manner that the hook or loop type fastening member 18 is coupled to the outer strike face 12. In one or more embodiments, the corresponding loop or hook type fastening member 20 on the frame 21 may be configured to extend around one or more of the sides 14, 15, 16, 17 of the armor panel 11 and onto the inner surface 13 of the armor panel 11. Accordingly, in one or more embodiments, the loop or hook type fastening member 20 on the frame 21 may be configured to be detachably coupled to the hook or loop type fastening member 18 on the outer strike surface 12, the one or more sides 14, 15, 16, 17, and the inner surface 13 of the armor panel 11. Providing the hook or loop type fastening member 18 on one or more of the sides 14, 15, 16, 17 and/or on the inner surface 13 in addition to outer strike face 12 may provide the modular armor system 10 with additional strength to withstand ballistic strikes and/or percussive blasts. In one or more embodiments, the hook or loop type fastening member 18 may be provided on one or more of the sides 14, 15, 16, 17 and/or on the inner surface 13 instead of the outer strike surface 12. Although only a single modular armor system 10 is illustrated installed around a single window 22, it will be appreciated that additional modular armor systems 10 may be installed around other windows in the vehicle or other structure in the same or similar manner described above.

The modular armor system 10 may include any suitable hook or loop fastening mechanism 18 configured to maintain the attachment between modular armor system 10 and the frame 21 of the vehicle or other structure when the armor panel 11 is struck by high-powered projectiles and/or percussive blasts. In one embodiment, the modular armor system 10 includes a hook fastening mechanism 18 having a series of single-filament 4 mil stainless steel hooks 23 disposed on a woven polymer base 24. In one embodiment, each of the hooks 23 are approximately 2.35 mm wide and approximately 90 mils (2.3 mm) tall, although the hooks 23 may have any other suitable width and height and still fall within the scope and spirit of the present invention. Additionally, the base 24 of the hook fastening mechanism 18 may be made from any other suitable materials, such as, for instance, metal, polyester, polyamide, polyethylene, or a combination of polyester and polypropylene. Additionally, as illustrated in FIG. 1A, the hook or loop fastening mechanism 18 may have any suitable width W, such as, for example, from approximately ¼ inch to approximately 3 inches, depending upon the ballistics protection rating of the modular armor system 10. In one embodiment, the width W of the hook or loop fastening mechanism 18 adhered to the armor panel 11 is approximately 1 inch. In general, armor panels 11 having higher ballistics ratings require hook and loop fastening mechanisms 18 having relatively greater widths W compared to armor panels 11 having relatively lower ballistics ratings. Additionally, in one embodiment, the hook and loop fastening mechanisms 18 have a shear strength of approximately 15.8 pounds per square inch ("psi"), as determined by testing standard ASTM 5169, a traction strength of approximately 6.4 psi, and a peel strength of approximately 1.4 pounds per inch of width ("piw"), as determined by testing standard ASTM 5170. It will be appreciated, however, that the hook and loop fastening mechanisms 18 of the present disclosure are not limited to the performance characteristics recited above, and the hook and loop fastening mechanisms 18 may have any other suitable performance characteristics depending upon the intended use for the modular armor system 10 and the desired ballistics protection rating of the armor panel 11 (e.g., the desired NIJ, HOSDB, STANAG, UL, EuroNorm, VPAM, or custom level of ballistics protection). For instance, in one embodiment, the hook and loop fastening mechanisms 18 may have a shear strength greater than 15.8 psi, a traction strength greater than 6.4 psi, and/or a peel strength greater than 1.4 piw.

Still referring to the embodiment illustrated in FIGS. 1A and 1B, the ballistics-grade armor panel 11 may be either transparent or opaque depending upon the intended application of the modular armor system 10. For instance, the armor panel 11 may be transparent when the modular armor system 10 is configured to cover windows in a vehicle or other structure and visibility through the armor panel 11 is desired. The armor panel 11 may be opaque when the modular armor system 10 is configured to be incorporated into a structural barrier or other structure where visibility through the structure is not desired or required. The transparent armor panel 11 may be composed of any suitable material configured to absorb and deflect kinetic energy and percussive energy, such as, for example, glass, interlayer, acrylic, polycarbonate, plastic, transparent ceramic, ionomers, ionoplasts, or any combinations thereof. In one embodiment, the ballistics-grade armor panel 11 includes a stack of alternating glass layers and interlayers. In another embodiment, the ballistics-grade armor panel 11 includes a stack of alternating glass layers and interlayers and a polycarbonate layer substituting for one or more of the glass layers. The opaque armor panel 11 may be composed of any suitable ballistics-grade material, such as, for example, metal (e.g., steel, titanium), metal alloys, ceramic, composite (e.g., carbon fiber reinforced plastic), aramids (i.e., synthetic fibers), or any combinations thereof.

As illustrated in FIGS. 1A and 1B, the ballistics-grade armor panel 11 may have any suitable thickness T depending upon the desired ballistics protection rating of the modular armor system 10. In one embodiment, the thickness T of the ballistics-grade armor panel 11 is from approximately ½ inch to approximately 3 inches. In one embodiment, a 1⅛ inch thick armor panel 11 (e.g., a 1⅛ inch thick glass, acrylic, and polycarbonate armor panel 11) is configured to provide NIJ Level IIIA ballistic protection. It will be appreciated that the thickness T of the ballistics-grade armor panel 11 is not limited to the thickness T recited above, and the ballistics-grade armor panel 11 may have any other suitable thickness T depending upon the desired ballistics protection rating of the armor panel 11 and still fall within the scope and spirit of the present disclosure.

In one embodiment, the adhesive layer 19 coupling the hook or loop fastening mechanism 18 to the ballistics-grade panel 11 is a thermoplastic or thermoset material (e.g., an aliphatic polyurethane sheet). The thermoplastic or thermoset adhesive layer 19 is configured to laminate the hook or loop fastening mechanism 18 to the ballistic-grade armor panel 11 when subject to elevated temperatures and pressures in an autoclave lamination process or any other suitable process. During the autoclave lamination process, the thermoplastic or thermoset adhesive layer 19 is drawn into the fibers in the woven base layer 24 of the hook or loop fastening member 18, thereby adhering the hook or loop fastening member 18 to the armor panel 11 (i.e., the adhesive 19 is infused into the woven base layer 24 of the hook or loop fastening member 18 due to the elevated temperature and pressure during the autoclave lamination process, thereby laminating the hook or loop fastening member 18 to the ballistic-grade armor panel 11). In one embodiment, the thermoplastic or thermoset adhesive layer 19 (e.g., aliphatic polyurethane) is configured to laminate the hook or loop fastening mechanism 18 to the ballistic-grade armor panel 11 when subject to a temperature of at least approximately 180° F. and a pressure of at least approximately 20 psi. In another embodiment, the adhesive layer 19 is configured to laminate the hook or loop fastening mechanism 18 to the ballistic-grade armor panel 11 when subject to a temperature of at least approximately 145° F. and a pressure of at least approximately 20 psi. It will be appreciated by a person of ordinary skill in the art that the adhesive layer 19 may be configured to laminate the hook or loop fastening mechanism 18 to the ballistic-grade armor panel 11 when subject to other suitable combinations of temperature and pressure.

In one embodiment, the aliphatic polyurethane adhesive layer 19 has a specific gravity of approximately 1.08, as determined by testing standard ASTM D-792, a hardness of 80 Shore A, as determined by testing standard ASTM D-2240, a tensile strength of 5345 psi, as determined by testing standard ASTM D412C, a modulus of elasticity at 100% elongation of approximately 460 psi, as determined by testing standard ASTM D412C, a modular of elasticity at 300% of approximately 1750 psi, as determined by testing standard ASTM D412C, an ultimate elongation of approximately 450%, as determined by testing standard ASTM D412C, and a tear strength of approximately 320 pounds per linear inch ("pli"), as determined by testing ASTM D624C. In another embodiment, the aliphatic polyurethane adhesive layer 19 has a specific gravity of approximately 1.08, a hardness of 80 Shore A, a tensile strength of 5010 psi, a modulus of elasticity at 100% elongation of approximately 465 psi, a modulus of elasticity at 300% elongation of approximately 1760 psi, an ultimate elongation of approximately 450%, and a tear strength of approximately 320 pli. In a further embodiment, the aliphatic polyurethane adhesive layer 19 has a specific gravity of approximately 1.08, a hardness of 67 Shore A, a tensile strength of 4600 psi, a modulus of elasticity at 100% elongation of approximately 268 psi, a modulus of elasticity at 300% elongation of approximately 491 psi, an ultimate elongation of approximately 550%, and a tear strength of approximately 300 pli. In yet another embodiment, the aliphatic polyurethane adhesive layer 19 has a specific gravity of approximately 1.08, a hardness of 64 Shore A, a tensile strength of 3500 psi, a modulus of elasticity at 100% elongation of approximately 350 psi, a modulus of elasticity at 300% elongation of approximately 630 psi, an ultimate elongation of approximately 600%, and a tear strength of approximately 260 pli. Suitable polyurethanes are not limited to the material properties listed above, and suitable polyurethanes for laminating the hook or loop fastening mechanism 18 to the ballistics-grade armor panel 11 may have any other suitable material properties. For instance, in one embodiment, the adhesive layer 19 may have a specific gravity greater than 1.08, a hardness greater than 80 Shore A, a tensile strength greater than 5345 psi, a modulus of elasticity at 100% elongation greater than 465 psi, a modulus of elasticity at 300% elongation greater than 1760 psi, an ultimate elongation greater than 600%, and/or a tear strength greater than 320 pli. Additionally, suitable adhesives are not limited to polyurethanes. Depending upon the material composition of the armor panel 11, the adhesive layer 19 may be composed of any other materials, such as, for instance, silicone adhesives, UV curable adhesives, urethane adhesives, or polyvinyl butyral adhesives (e.g., polyvinyl butyral plasticized with dihexyl adipate ordibutyl sebacate), suitable for bonding to the armor panel 11.

Figure 2A:
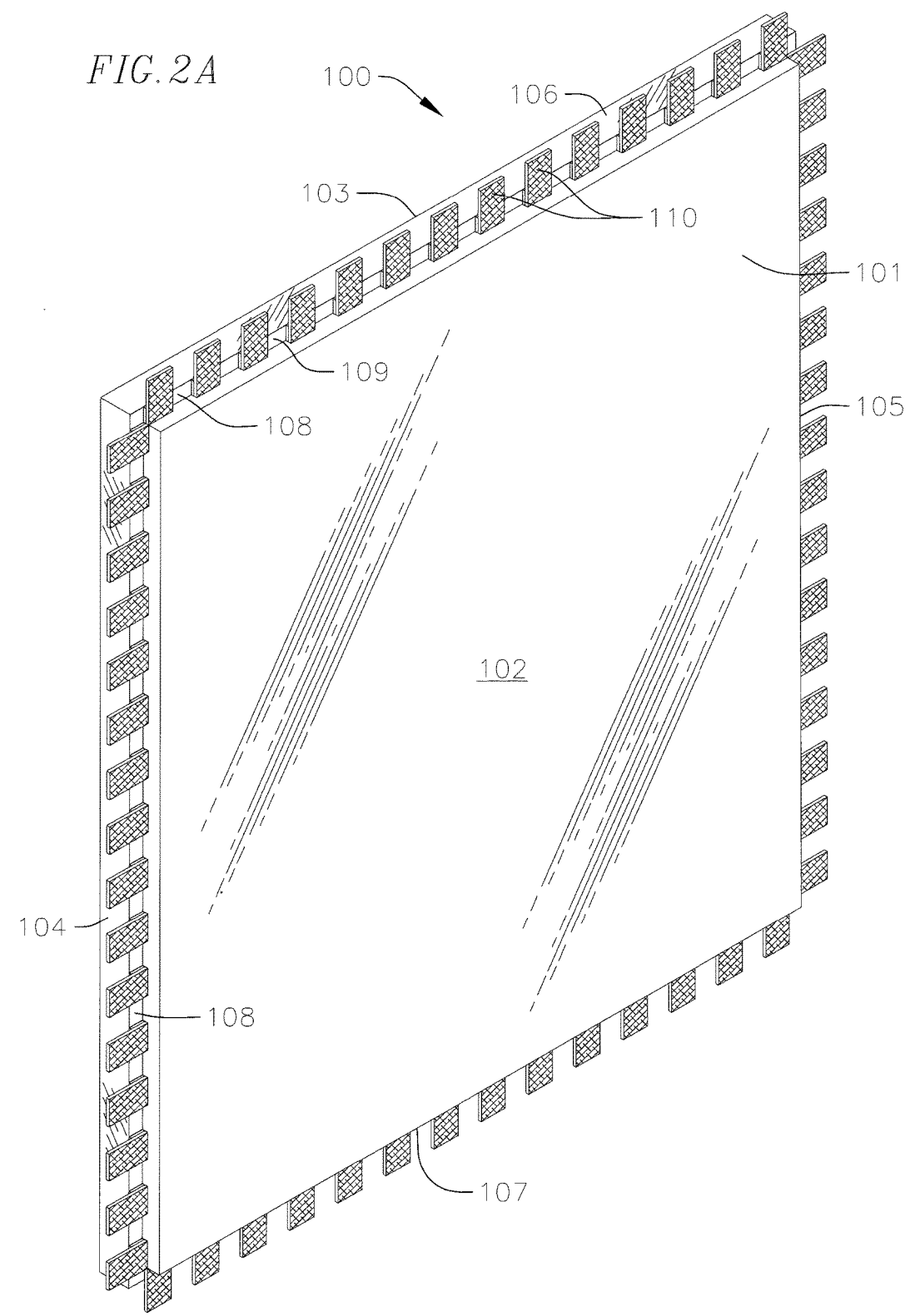
FIG. 2A is a front perspective view of a modular armor system according to another embodiment of the present disclosure.
Figure 2B:
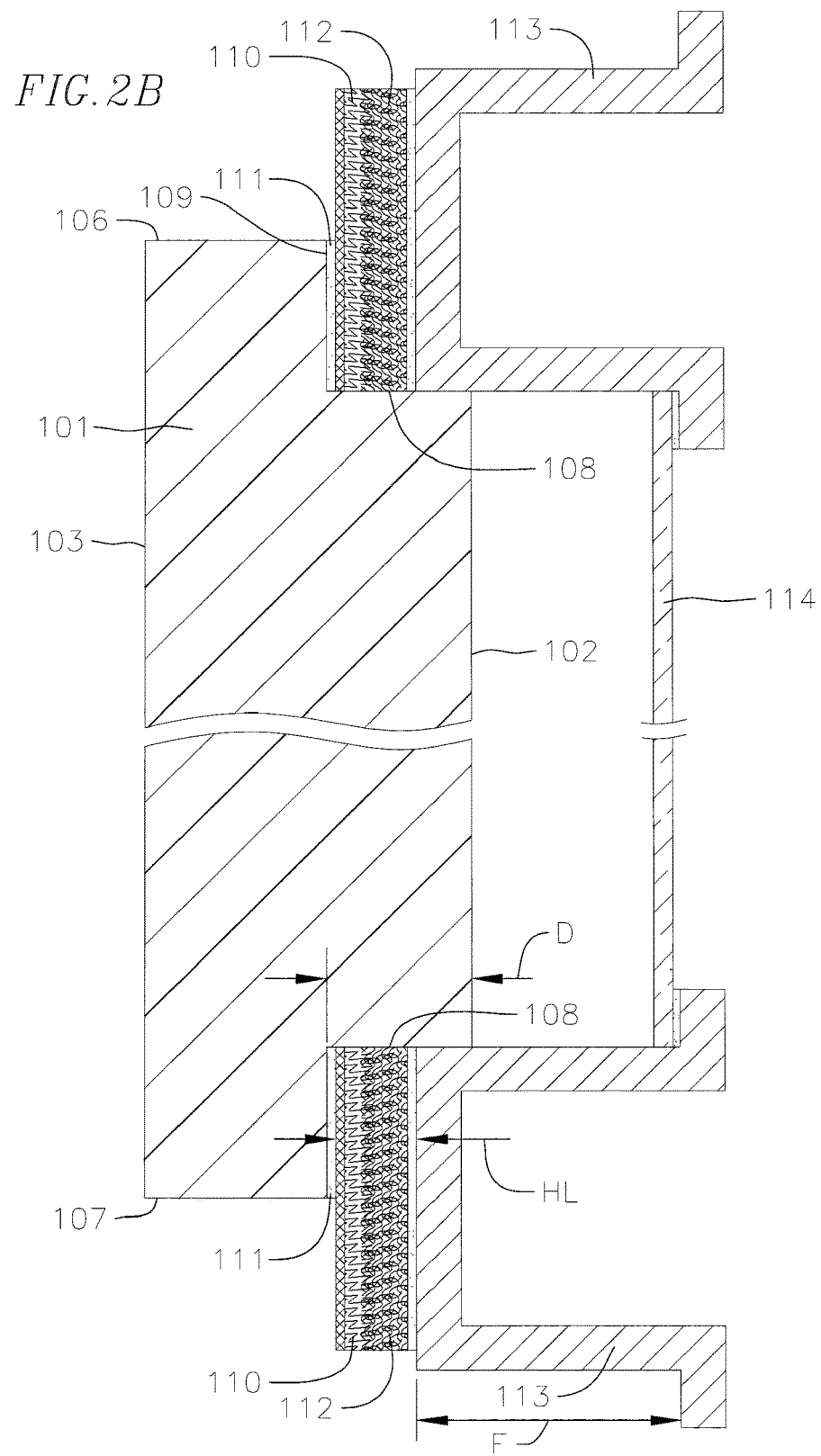
FIG. 2B is a cross-sectional view of the modular armor system of FIG. 2A.

With reference now to FIGS. 2A and 2B, a modular armor system 100 according to another embodiment of the present disclosure is illustrated. In the illustrated embodiment, the modular armor system 100 includes a ballistics-grade armor panel 101 having an outer strike face 102 and an inner surface 103 opposite the outer strike face 102. In the illustrated embodiment, the armor panel 101 is a rectangular prism having a pair of opposing sides 104, 105 and a pair of upper and lower sides 106, 107, respectively. In alternate embodiments, the armor panel 101 may have any other suitable shape, such as, for instance, circular, trapezoidal, triangular, or even irregularly shaped, depending upon the shape of the windows in the vehicle or other structure in which the modular armor system 100 is intended to be installed. As described above with reference to FIGS. 1A and 1B, the armor panel 101 may be composed of either transparent materials (e.g., glass, interlayer, acrylic, polycarbonate, plastic, transparent ceramic, ionomers, ionoplasts, or any combinations thereof) or opaque materials (e.g., metal, such as steel or titanium, metal alloys, ceramics, composites, such as carbon fiber reinforced plastic, synthetic fibers, or any combinations thereof) depending upon the intended application of the modular armor system 100. Additionally, as described above, the armor panel 101 may have any suitable thickness depending upon the desired ballistics protection rating of the armor panel 101, such as, for instance, from approximately ½ inch to approximately 3 inches.

Still referring to FIGS. 2A and 2B, the armor panel 101 includes a step or recess 108 extending inward from the outer strike face 102 toward the inner surface 103. In the illustrated embodiment, the step 108 extends continuously around the entire periphery of the armor panel 101 (i.e., the step 108 extends continuously along all four sides 104, 105, 106, 107 of the armor panel 101). In one or more alternate embodiments, the step 108 may extend around less than all of the sides 104, 105, 106, 107 of the armor panel 101, such as, for instance, along the upper and lower sides 106, 107 of the armor panel 101. The step 108 in the armor panel 101 defines an intermediate surface 109 disposed between the outer strike face 102 and the inner surface 103, the significance of which is described below.

In the illustrated embodiment of FIGS. 2A and 2B, the modular armor system 100 also includes a plurality of hook or loop type fastening tabs 110 bonded along the intermediate surface 109 of the armor panel 101 with a layer of adhesive 111. The hook or loop fastening tabs 110 are configured to be releasably secured to corresponding loop or hook type fastening members 112 bonded to a frame or border 113 around a window 114 in a vehicle or other structure, as illustrated in FIG. 2B. Additionally, a portion of each of the hook or loop type fastening tabs 110 extends beyond the respective sides 104, 105, 106, 107 of the ballistics-grade armor panel 101 (i.e., a portion of each of the hook or loop type fastening tabs 110 disposed along the sides 104, 105, 106, 107 of the ballistics-grade armor panel 101 overhangs the sides 104, 105, 106, 107 of the ballistics-grade armor panel 101, respectively). The overhanging hook or loop fastening tabs 110 are configured to enable the modular armor system 100 to be detachably attached to an asymmetric or irregularly-shaped frame 113 (i.e., the overhanging hook or loop fastening tabs 110 are configured to enable the fastening tabs 110 to conform to the organic shape of the frame 113 surrounding the window 114 in the vehicle or other structure). Accordingly, the modular armor system 100 may be releasably attached to a frame and a corresponding window that do not match the shape and size of the armor panel 101. The hook or loop fastening tabs 110 may be the same or similar to the hook or loop fastening members 18 described above with reference to FIGS. 1A and 1B. For instance, in one embodiment, the hook fastening tabs 110 each include a series of single-filament 4 mil stainless steel hooks disposed on a woven polymer base. Moreover, although the modular armor system 100 in the illustrated embodiment of FIGS. 2A and 2B includes a plurality of separate hook or loop fastening tabs 110, in an alternate embodiment, the modular armor system 100 may include a single, continuous hook or loop fastening member extending around the periphery of the armor panel 101. Additionally, the adhesive layer 111 may be the same or similar to the adhesive layer 19 described above with reference to FIGS. 1A and 1B. The adhesive layer 111 is configured to laminate the hook or loop fastening tabs 110 to the ballistic-grade armor panel 101 when subject to elevated temperatures and pressures during an autoclave lamination process or any other suitable process. In one or more alternate embodiments, the hook or loop fastening tabs 110 may not overhang one or more of the sides 104, 105, 106, 107 of the ballistics-grade armor panel 101 (i.e., the hook or loop fastening tabs 110 may not extend beyond one or more of the sides 104, 105, 106, 107 of the ballistics-grade armor panel 101). Additionally, in one or more embodiments, the hook or loop type fastening tabs 110 may also be coupled to one or more of the sides 104, 105, 106, 107 of the armor panel 101 and/or to the inner surface 103 of the armor panel 101. In one or more embodiments, the hook or loop type fastening tabs 110 on the inner surface 103 may overhang (i.e., extend beyond) one or more of the sides 104, 105, 106, 107 of the armor panel 101. In one or more embodiments, the hook or loop type fastening tabs 110 on the inner surface 103 may not extend beyond the sides 104, 105, 106, 107 of the armor panel 101. The hook or loop type fastening tabs 110 may be coupled to one or more of the sides 104, 105, 106, 107 and/or to the inner surface 103 of the armor panel 101 in the same or similar manner that the hook and loop type fastening tabs 110 are coupled to the intermediate surface 109 of the armor panel 101. In one or more embodiments, the corresponding loop or hook type fastening members 112 on the frame 113 may be configured to extend around one or more of the sides 104, 105, 106, 107 of the armor panel 101 and onto the inner surface 103 of the armor panel 103. Accordingly, in one or more embodiments, the loop or hook type fastening members 112 on the frame 113 may be configured to be detachably coupled to the hook or loop type fastening tabs 110 on the intermediate surface 109, the one or more sides 104, 105, 106, 107, and the inner surface 103 of the armor panel 101. Providing the hook or loop type fastening tabs 110 on one or more of the sides 104, 105, 106, 107 and/or on the inner surface 103 in addition to the intermediate surface 109 may provide the modular armor system 100 with additional strength to withstand ballistic strikes and/or percussive blasts. In one or more embodiments, the hook or loop type fastening tabs 110 may be provided on one or more of the sides 104, 105, 106, 107 and/or on the inner surface 103 instead of the intermediate surface 109.

As illustrated in FIG. 2B, the step 108 in the periphery of the armor panel 101 is configured to enable the outer strike face 102 of the armor panel 101 to abut, or be closely spaced apart from, the window 114 in the vehicle or other structure (i.e., the step 108 in the armor panel 101 is configured to receive at least a portion of the frame 113 surrounding the window 114 such that outer strike face 102 of the armor panel 101 abuts, or is closely spaced apart from, the window 114). Based upon the thickness F of the frame 113 and the combined thickness HL of the hook and loop fastening members 110, 112, the depth D of the step 108 in the armor panel 101 may be selected to achieve the desired spacing between the outer strike face 102 of the armor panel 101 and the window 114. For instance, in one embodiment, the depth D of the step 108 in the armor panel 101 is substantially equal to the combined thickness F of the frame 113 surrounding the window 114 and the thickness HL of the hook and loop fastening member 110, 112 such that the outer strike surface 102 of the armor panel 101 abuts the window 114. In another embodiment, depth D of the step 108 in the armor panel 101 is slightly less than the combined thickness F of the frame 113 and the thickness HL of hook and loop fastening members 110, 112, such as, for instance, approximately 0.1 inch less than the combined thickness F of the frame 113 and the thickness HL of hook and loop fastening members 110, 112, such that the outer strike face 102 of the armor panel 101 is spaced apart from the window 114 by a desired distance, such as, for instance, approximately 0.1 inch.

Figure 3B:
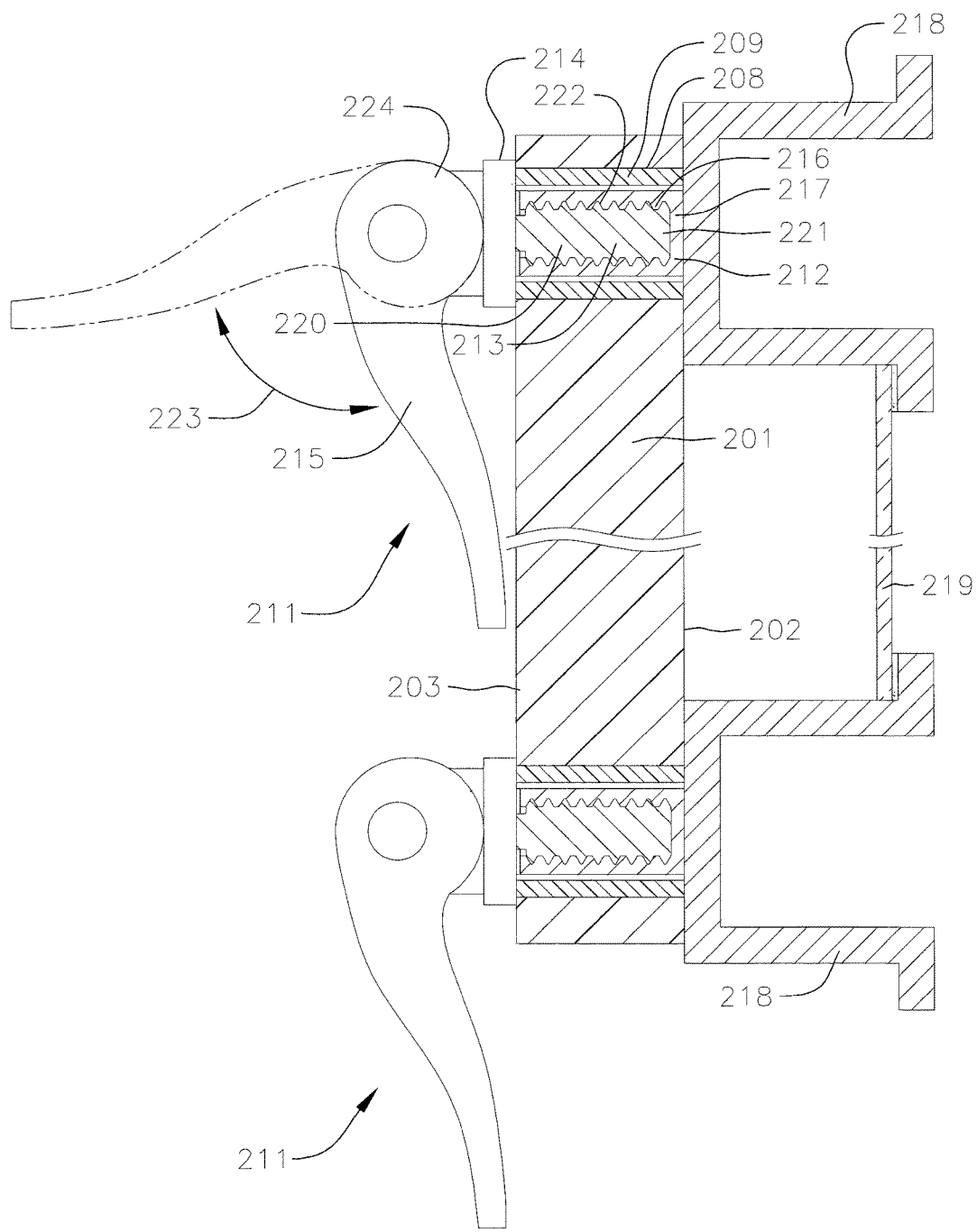
FIG. 3B is a cross-sectional view of the modular armor system of FIG. 3A.

With reference now to FIGS. 3A and 3B, a modular armor system 200 according to another embodiment of the present disclosure is illustrated. In the illustrated embodiment, the modular armor system 200 includes a ballistics-grade armor panel 201 having an outer strike face 202 and an inner surface 203 opposite the outer strike face 202. In the illustrated embodiment, the armor panel 201 is a rectangular prism having a pair of opposing sides 204, 205 and a pair of opposing upper and lower sides 206, 207, respectively. In alternate embodiments, the armor panel 201 may have any other suitable shape, such as, for instance, circular, trapezoidal, triangular, or even irregularly shaped, depending upon the shape of the windows in the vehicle or structure in which the modular armor system is intended to be installed. As described above with reference to FIGS. 1A and 1B, the armor panel 201 may be composed of either transparent materials (e.g., glass, interlayer, acrylic, polycarbonate, plastic, transparent ceramic, ionomers, ionoplasts, or any combinations thereof) or opaque materials (e.g., metal, such as steel or titanium, metal alloys, ceramics, composites, such as carbon fiber reinforced plastic, aramids (i.e., synthetic fibers), or any combinations thereof) depending upon the intended application of the modular armor system 200. Additionally, as described above with reference to FIGS. 1A and 1B, the armor panel 201 may have any suitable thickness depending upon the desired ballistics protection rating of the armor panel 201, such as, for instance, from approximately ½ inch to approximately 3 inches.

With continued reference to FIGS. 3A and 3B, the ballistics-grade armor panel 201 includes a plurality of openings 208 and a corresponding plurality of bushings 209 received in the openings 208. In the illustrated embodiment, the openings 208 are circular holes and the bushings 209 are thin-walled cylinders. In one or more alternate embodiments, the openings 208 in the armor panel 201 may have any other suitable shape, such as, for instance, square, rectangular, or oval, and the bushings 209 may have any corresponding shape configured to match the shape of the openings 208. Although in the illustrated embodiment, the modular armor system 200 includes four openings 208 and four corresponding bushings 209, the modular armor system 200 may have any other suitable number of openings 208 and corresponding bushings 209, such as, for example, two to ten. Additionally, although in the illustrated embodiment the openings 208 and bushings 209 are located proximate to corners 210 of the armor panel 201, the openings 208 and bushings 209 may be located at any other suitable positions, such as, for example, along all four sides 204, 205, 206, 207 of the armor panel 201 or along only the upper and lower sides 206, 207 of the armor panel 201. In one embodiment, an inner dimension of the openings 208 is substantially equal to an outer dimension of the bushings 209 such that the bushings 209 are configured to be received in the openings 208 with a press-fit connection (i.e., a friction fit connection). In an alternate embodiment, the outer dimension of the openings 208 may be slightly larger than the outer dimension of bushings 209, and the bushings 209 may be bonded into the openings 208 with any suitable adhesive, such as, for instance, silicone adhesive or UV curable adhesive. In another embodiment, an outer surface of the bushings 209 may include threads and an inner surface of the openings 208 may include corresponding threads such that the bushings may be threaded into the openings 208 in the armor panel 201.

With continued reference to the embodiment illustrated in FIGS. 3A and 3B, the modular armor system 200 includes a plurality of quick-release mechanisms 211 configured to detachably couple the ballistics-grade armor panel 201 to a vehicle or other structure. Each quick-release mechanism 211 is configured to move between an engaged position in which the ballistics-grade panel 201 is detachably coupled to the vehicle or other structure and a disengaged position in which the ballistics-grade panel 201 may be detached and removed from the vehicle or other structure. Accordingly, the quick-release mechanisms 211 of the present disclosure are configured to facilitate rapid installation and removal of the armor panel 201 from a vehicle or other structure.

As illustrated in FIG. 3B, each quick-release mechanism 211 is a quick-release skewer assembly including a female member 212, a male member 213 configured to be threadedly received in the female member 212, a spring-loaded nut 214, and a cam lever 215. In one embodiment, the female member 212 is a cylindrical tube having a threaded inner bore 216. Additionally, in the illustrated embodiment of FIG. 3B, an outer end 217 of the female member 212 is affixed to a frame 218 surrounding a window 219 in a vehicle or other structure. The female member may be affixed to the frame 218 by any suitable means, such as, for instance, bonding, welding, or mechanical fastening. In an alternate embodiment, the female member 212 may be detachably coupled to the frame 218, such as, for instance, by fasteners.

With continued reference to FIG. 3B, the male member 213 is a cylindrical rod having an inner end 220 and an outer end 221 opposite the inner end 220. The male member 213 also includes outer threads 222 such that the male member 213 may be coupled to the female member 212 by threading the male member 213 into the threaded inner bore 216 in the female member 212. Together, the male and female members 213, 212 are configured to extend through the openings 208 in the armor panel 201.

Still referring to FIG. 3B, the spring-loaded nut 214 is slidably attached to the inner end 220 of the male member 213. The spring-loaded nut 214 is configured to slide between an engaged position and a disengaged position. In the engaged position, a portion of the nut 214 presses against the inner surface 203 of the ballistics-grade armor panel 201 and thereby secures the ballistics-grade armor panel 201 to the frame 218 of the vehicle or other structure. In the disengaged position, the spring-loaded nut 214 is spaced apart from the inner surface 203 of the armor panel 201, which facilitates detachment of the armor panel 201 from the frame 218, as described in detail below. It will be appreciated that the spring-loaded nut 214 is larger than the openings in the bushings 209 such that the armor panel 201 is retained by the spring-loaded nuts 214 on the quick-release skewers 211. Additionally, a spring (not shown) is configured to bias the nut 214 into the disengaged position (i.e., the spring is configured to bias the nut 214 toward the inner end 220 of the male member 213).

As illustrated in FIG. 3B, the cam lever 215 is pivotally attached to the inner end 220 of the male member 213 and the spring-loaded nut 214 is disposed between the cam lever 215 and the outer end 221 of the male member 213. The cam lever 215 is configured to pivot (arrow 223) between an engaged position (shown in solid lines in FIG. 3B) and a disengaged position (shown in dashed lines in FIG. 3B). In the engaged position, an eccentric cam 224 on the cam lever 215 is configured to force the spring-loaded nut 214 outward along the male member 213 and into the engaged position (i.e., the eccentric cam 224 is configured to overcome the biasing force of the spring). In the disengaged position, the eccentric cam 224 disengages the spring-loaded nut 214, thereby allowing the spring to force the spring-loaded nut 214 back into the disengaged position.

To removably attach the armor panel 201 illustrated in FIGS. 3A and 3B to the frame 218 surrounding the window 219 in the vehicle or other structure, the female members 212 are first coupled to the frame 218 by any suitable means, such as, for instance, mechanical fastening, welding, bonding, or any combination thereof. The ballistics-grade armor panel 201 may then be positioned such that the female members 212 extend into the openings 208 and the corresponding bushings 209 in the ballistics-grade panel 201. Once the female members 212 are received in the openings 208 and the bushings 209 in the ballistics-grade armor panel 201, the male members 213 of the quick-release skewers 211 may then be threaded into the threaded inner bores 216 in the female members 212 until the spring-loaded nuts 214 abut, or are closely spaced apart from, the inner surface 203 of the ballistics-grade armor panel 201. The extent to which the male members 213 must be threaded into the female members 212 depends on length of the male and female members 213, 212 and the thickness of the ballistics-grade armor panel 201. The male members 213 may be threaded into the female members 212 by rotating the cam levers 215, which are connected to the inner ends 220 of the male members 213, in a clockwise direction. The cam levers 215 may then be pivoted (arrow 223) into the engaged position (shown in solid lines in FIG. 3B) by applying sufficient force to overcome the force of the springs biasing the nuts 214 into the disengaged position. As the cam levers 215 are pivoted (arrow 223) into the engaged position, the eccentric cams 224 on the cam levers 215 force the nuts 214 to slide outward along the male members 213 and press against the inner surface 203 of the ballistics-grade armor panel 201. The force supplied by the nuts 214 pressing against the inner surface 203 of the ballistics-grade armor panel 201 is configured to detachably secure the ballistics-grade armor panel 201 to the frame 218 of the vehicle or other structure.

To detach the ballistics-grade armor panel 201 from the frame 218 of the vehicle or other structure, the cam levers 215 are rotated (arrow 223) back into the disengaged position. In the disengaged position, the springs in the quick-release skewers 211 are configured to slide the nuts 214 outward along the male members 213 and into the disengaged position (i.e., in the disengaged position, the eccentric cams 224 on the cam levers 214 no longer force the nuts 214 outward to overcome the biasing force of the springs and thus the springs are permitted to force the nuts 214 to slide inward into the disengaged position). As the nuts 214 slide inward into the disengaged position, the forced supplied by the nuts 214 against the inner surface 203 of the ballistics-grade panel is reduced. The male members 213 may then be unthreaded from the female members 212, such as, for example, by rotating the cam levers 215 in a counterclockwise direction. In this manner, the male members 213 may be completely disengaged from the female members 212, which enables the user to detach the ballistics-grade armor panel 201 from the frame 218 by sliding the ballistics-grade armor panel 201 inward and drawing the female members 212 out of the openings 208 and the corresponding bushings 209 in the ballistics-grade armor panel 201.

In one embodiment, the female members 212 of the quick-release skewers 211 are configured to remain affixed to the frame 218 of the vehicle or other structure, which facilitates rapid reinstallation of the ballistics-grade armor panel 218 in the manner described above. Permanently affixing the female members 212 to the frame 218 of the vehicle or other structure also eliminates the likelihood that these components will be dropped and lost during the process of repeatedly detaching and installing the ballistics-grade armor panel 201 from the vehicle or other structure. However, in one or more alternate embodiments, the female members 212 may be detached from the frame 218 of the vehicle or other structure and used, for instance, in another vehicle or structure.

Figure 4:
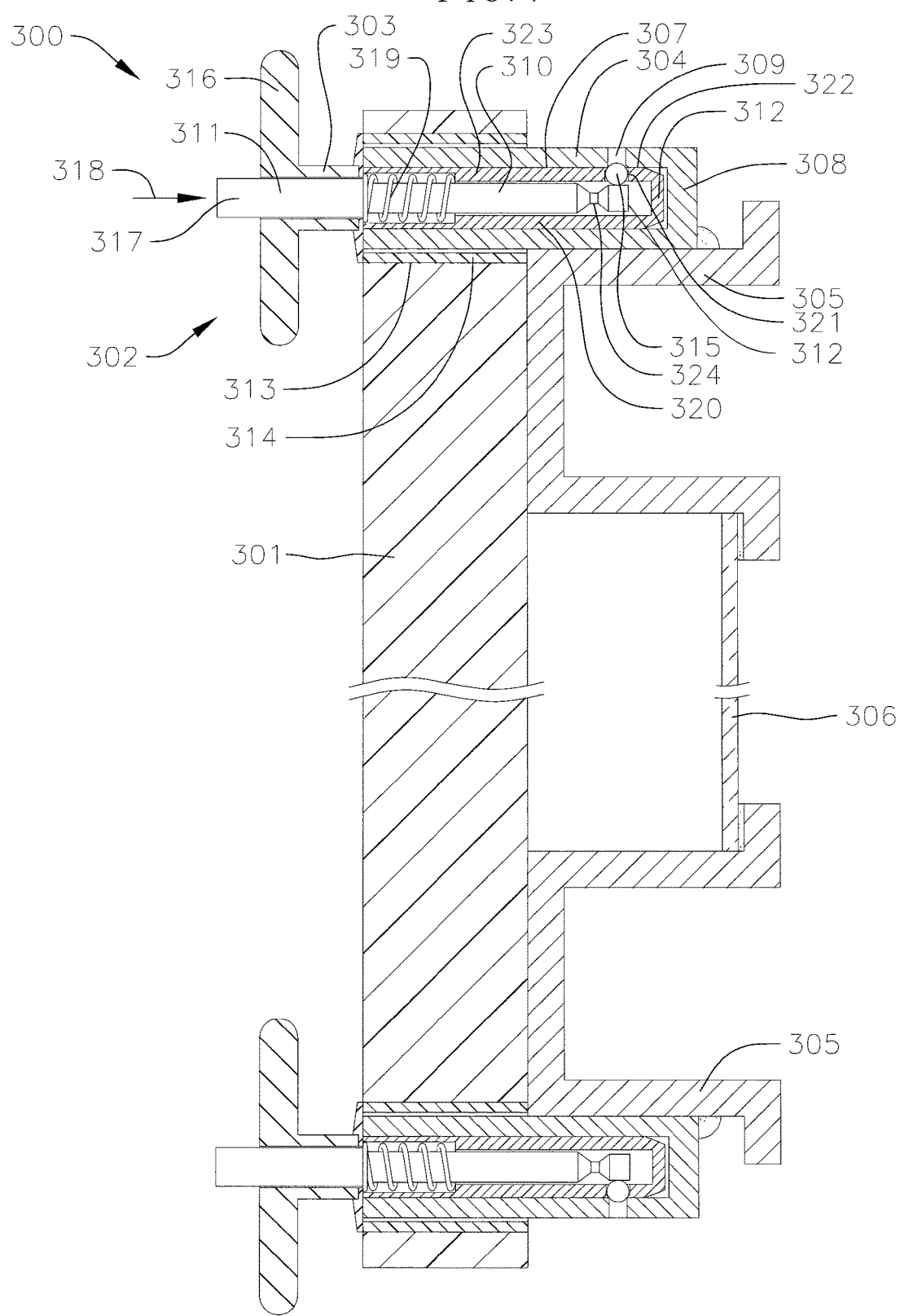
FIG. 4 is a cross-section view of a modular armor system according to another embodiment of the present disclosure.

With reference now to FIG. 4, another embodiment of a modular armor system 300 is illustrated. The modular armor system illustrated in FIG. 4 includes a ballistics-grade armor panel 301 that is the same or substantially similar to the armor panel 201 described above with reference to FIGS. 3A and 3B, and therefore the ballistics-grade armor panel 301 of FIG. 4 is not described below in order to avoid duplication. Instead, the description below of the modular armor system 300 focuses on the differences between the quick-release mechanisms of FIG. 4 and the quick-release mechanisms 211 of FIG. 3. In the embodiment illustrated in FIG. 4, each quick-release mechanism is a push button pin assembly 302 including a push button pin 303 and a female member 304. The push button pin 303 is configured to detachably engage the female member 304 to secure the armor panel 301 to a frame 305 surrounding a window 306 in a vehicle or other structure and to facilitate detachment and removal of the armor panel 301 from the frame 305 of the vehicle or other structure.

In the illustrated embodiment of FIG. 4, each female member 304 is a thin-walled cylindrical tube having a central opening 307. In one or more alternate embodiments, the female member 304 may have any other suitable shape, such as, for instance, a square tube or a triangular tube. An outer end 308 of the female member 304 is coupled to the frame 305 surrounding the window 306. In one embodiment, the female member 304 may be fixedly coupled to the frame 305, such as, for instance, by welding, bonding, or mechanical fastening. In another embodiment, the female member 304 may be detachably coupled to the frame 305. The female member 304 also includes one or more radially disposed openings 309, the significance of which is described below.

With continued reference to FIG. 4, each of the push button pins 303 includes a cylindrical shaft 310 having an inner end 311 and an outer end 312 opposite the inner end 311. Additionally, in the illustrated embodiment, each of the push button pins 303 includes a cylindrical sleeve 320 extending around the cylindrical shaft 310. The cylindrical sleeve 320 also includes one or radially disposed openings 321, the significance of which is described below. At least a portion of the cylindrical shaft 310 and the cylindrical sleeve 320 are configured to extend through an opening 313 and a corresponding bushing 314 in the armor panel 301 and into the central opening 307 in the female member 304 coupled to the frame 305. In one or more alternate embodiments, the shaft 310 and the sleeve 320 may have any other suitable shape configured to be received in the central opening 307 of the female member 304, such as, for instance, a square post or a triangular prism.

Each push button pin 303 also includes one or more balls 315 circumferentially disposed around the shaft 310. In the illustrated embodiment, the balls 315 are proximate the outer end 312 of the shaft 310. The one or more balls 315 are configured to move between an extended position (e.g., a position in which a portion of each of the balls 315 extends completely through the one or more openings 321 in the sleeve 320 and protrudes outward from an outer surface 322 of the sleeve 320) and a retracted position (e.g., a position in which the balls 315 are recessed such that no portion of the balls 315 protrudes outward from the outer surface 322 of the sleeve 320). In the illustrated embodiment, a thickness of a wall 323 of the sleeve 321 is smaller than a diameter of the balls 315 such that the balls 315 are configured to extend outward from the outer surface 322 of the sleeve 321 when the balls 315 are in the extended position. Additionally, in the illustrated embodiment, a diameter of the openings 321 in the sleeve 320 is smaller than the diameter of the balls 315 such that the openings 321 are configured to retain the balls 315 (i.e., the openings 321 are sized to prevent the balls 315 from falling out through the openings 321). In the extended position, the balls 315 are configured to protrude into the openings 309 in the female member 304, thereby coupling the push button pin 303 and the female member 304 together. In the retracted position, the balls 315 are disengaged from the openings 309 in the female member 304, thereby permitting the user to detach the push button pin 303 from the female member 304 by drawing the shaft 310 and the sleeve 320 out of the central opening 307 in the female member 304, as described in more detail below. The number of balls 315 on the push button pin 303 corresponds to the number of openings 321 in the sleeve 320 and the number of openings 309 in the female member 304. In one embodiment, the push button pins 303 each have two balls 315 and the sleeve 320 and the female members 304 each have two corresponding openings 321, 309, respectively, although in one or more alternate embodiments the push button pins 303 may have any other suitable number of balls 315 and corresponding openings 321, 309.

Still referring to FIG. 4, the push button pins 303 also include a head or handle portion 316 coupled to the inner end 311 of the shaft 310. In the illustrated embodiment, the handle 316 is T-shaped, although in other embodiments the handle 316 may have any other suitable shape, such as, for instance, L-shaped or circular. It will be appreciated that the handle portion 316 is larger than the openings in the bushings 314 such that the armor panel 301 is retained by the handles 316 on the push button pins 303. The handle 316 also includes a push button 317 configured to move the balls 315 on the outer end 312 of the shaft 310 into the retracted position (e.g., in one embodiment, the inner most end of the shaft 310 may define the push button 317). When the push button 317 is depressed (arrow 318), the shaft 310 moves in a direction toward the outer end 308 of the female member 304. As the shaft 310 moves toward the outer end 308 of the female member 304, a recess 324 in the shaft 310 becomes aligned with the balls 315 such that the balls 315 tend to fall into the recess 324 (e.g., under the force of gravity). The movement of the balls 315 into the recess 324 in the shaft 310 moves the balls 315 into the retracted position in which the balls 315 are disengaged from the one or more openings 309 in the female member 304. When the balls 315 are disengaged from the openings 309 in the female member 304, a user may detach the push button pin 303 from the female member 304, and thereby detach the ballistics-grade armor panel 301 from the frame 305, by withdrawing the shaft 310 and the sleeve 320 out of the central opening 307 in the female member 304. When the push button 317 on the handle 316 is released, a spring mechanism 319 is configured to bias the push button 317 and the shaft 310 to move in a direction away from the outer end 308 of the female member 304. As the shaft 310 moves away from the outer end 308 of the female member 304, the recess 324 in the shaft 310 moves out of alignment with the balls 315 such that the balls 315 are forced out of the recess 324 in the shaft 310. When the push button pin 303 is inserted into the opening 307 in the female member 304 such that the balls 315 are aligned with the openings 309 in the female member 304, the movement of the balls 315 out of the recess 324 in the shaft 310 causes the balls 315 to return to the extended position in which the balls 315 extend into the openings 309 in the female member 304. The extension of the balls 315 into the openings 309 in the female member 304 detachably couples the ballistics-grade armor panel 301 to the frame 305.

To removably attach the armor panel 301 illustrated in FIG. 4 to the frame 305 of the vehicle or other structure, the outer ends 308 of the female members 304 are first coupled to the frame 305 surrounding the window 306 by any suitable means, such as, for instance, mechanical fastening, welding, bonding, or any combination thereof. The ballistics-grade armor panel 301 is then positioned such that at least a portion of the female members 304 extend into the openings 313 and corresponding bushings 314 in the ballistics-grade armor panel 301. The push buttons 317 on the push button pins 303 are then depressed (arrow 318) to move the balls 315 into the retracted position and then the push button pins 303 are inserted into the openings 313 and the bushings 314 in the armor panel 301 and into the central openings 307 in the female members 304. Once the push button pins 303 are sufficiently inserted into the female members 304 such that the balls 315 on the push button pins 303 are aligned with the openings 309 in the female members 304, the push buttons 317 may be released such that the springs 319 force the balls 315 into the extended position in which the balls 315 engage the openings 309 in the female members 304. Alternatively, the user may release the push button 317 once the balls 315 have entered the central opening 307 in the female member 304 and then slide the shaft 310 and the sleeve 320 toward the outer end 308 of the female member 304 until the balls 315 are aligned with the openings 309 in the female member 304, at which point the biasing force of the spring 319 will force the balls 315 into the extended position in which the balls 315 engage the openings 309 in the female member 304.

To detach the armor panel 301 from the frame 305 of the vehicle or other structure, the user depresses (arrow 318) the push buttons 317 on the handles 316 such that the balls 315 move into the retracted position in which the balls 315 are recessed in the recesses 324 of the shafts 310 of the push button pins 303. In the retracted position, the balls 315 are disengaged from the openings 309 in the female members 304. The user then draws the push button pins 303 out of the central openings 307 in the female members 304 and out of the bushings 314 in the openings 313 in the armor panel 301. Finally, the armor panel 301 may be detached from the frame 305 of the vehicle or other structure by pulling the armor panel 301 away from the window 306 such that the female members 304 are withdrawn from the openings 313 and corresponding bushings 314 in the armor panel 301. In the illustrated embodiment of FIG. 4, the female members 304 may remain affixed to the frame 305 of the vehicle or other structure, which facilitates rapid reinstallation of the ballistics-grade armor panel 301 in the manner described above. In one or more alternate embodiments, the female members 303 may be detached from the frame 305 of the vehicle or other structure and used, for instance, in another vehicle or structure.

Figure 5:
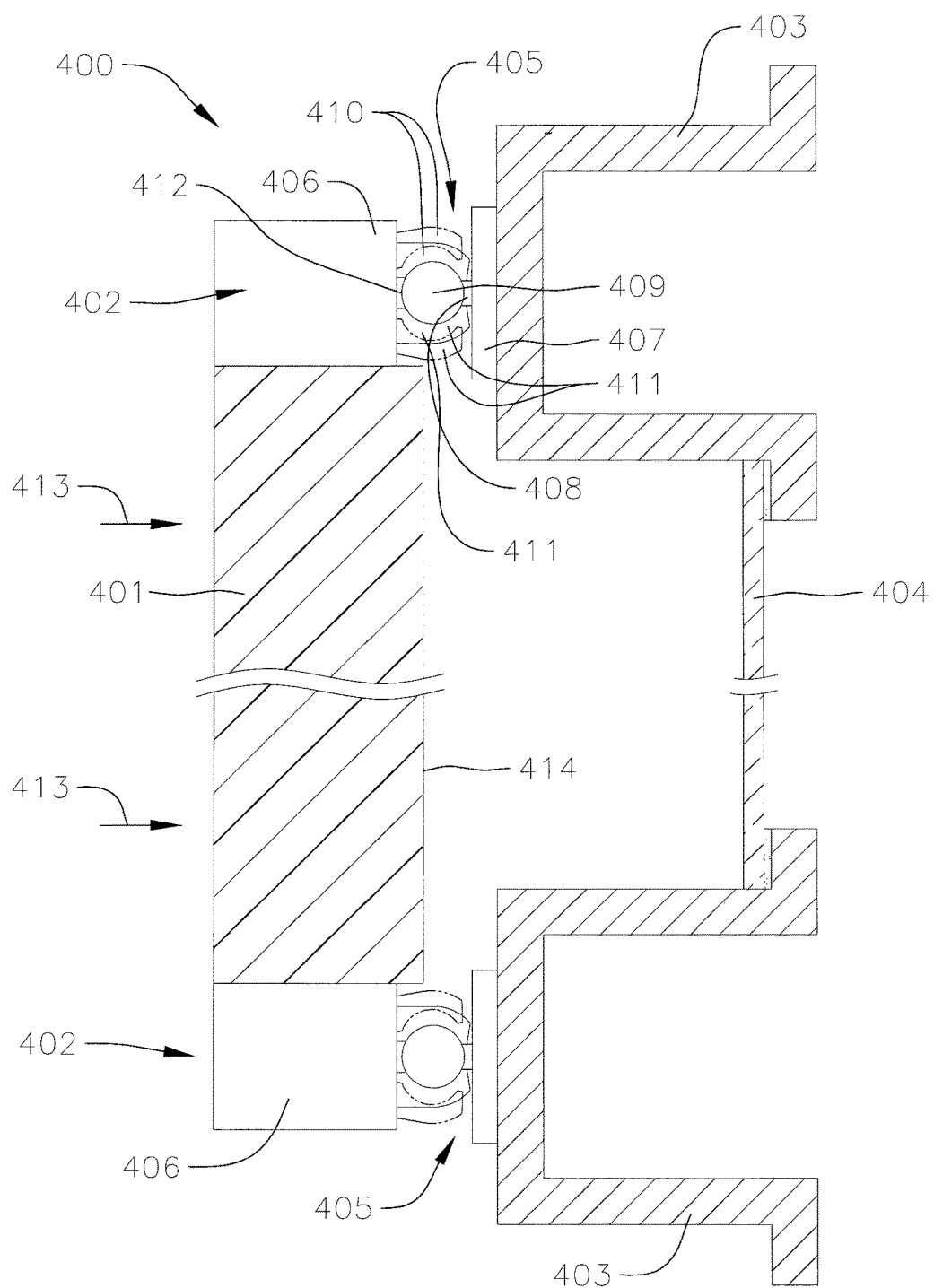
FIG. 5 is a cross-section view of a modular armor system according to a further embodiment of the present disclosure.

With reference now to FIG. 5, another embodiment of a modular armor system 400 is illustrated. The modular armor system 400 illustrated in FIG. 5 includes a ballistics-grade armor panel 401 that is the same or substantially similar to the armor panel 11 described above with reference to FIGS. 1A and 1B. The modular armor system 400 also includes a plurality of quick-release mechanisms 402 configured to detachably couple the armor panel 401 to a frame 403 surrounding a window 404 in a vehicle or other structure. In the embodiment illustrated in FIG. 5, the quick-release mechanisms are push-to-open grab latches 402.

Still referring to FIG. 5, each push-to-open grab latch 402 includes a knob bracket 405 configured to be coupled to the frame 403 surrounding the window 404 and a latch assembly 406 coupled to the armor panel 401. In an alternate embodiment, the knob bracket 405 may be coupled to the armor panel 401 and the latch assembly 406 may be coupled to the frame 403. The latch assembly 406 is configured to detachably engage the knob bracket 405 to secure the armor panel 401 to the frame 403 of the vehicle or other structure and facilitate detachment and removal of the armor panel 401 from the frame 403 of the vehicle or other structure. The modular armor system 400 may include any suitable number of push-to-open grab latches 402, such as, for instance, two to ten, or even more than ten, and the latch assemblies 406 may be disposed along one or more of the edges of the armor panel 401. For instance, in one embodiment, two latch assemblies 406 are disposed along each of an upper edge and a lower edge of the armor panel 401.

In the illustrated embodiment of FIG. 5, the knob bracket 405 includes a base plate 407, a post 408 projecting inward from the base plate 407, and a knob 409 on a free end of the post 408. In one embodiment, the base plate 407 on the knob bracket 405 may include a plurality of openings configured to receive fasteners (not shown) coupling the knob bracket 405 to the frame 403 surrounding the window 404. In an alternate embodiment, the base plate 407 of the knob bracket 405 may be provided without openings, and the knob bracket 405 may be coupled to the frame 403 by any other suitable means, such as, for instance, bonding or welding.

As illustrated in FIG. 5, the latch assemblies 406 each include a pair of opposing jaws 410, 411 configured to move between an open position (shown in dashed lines) and a closed position (shown in solid lines). In the closed position, the jaws 410, 411 are configured to clamp around the knob 409 on the free end of the knob bracket 405, thereby releasably coupling the armor panel 401 to the frame 403 surrounding the window 404. In the open position, the jaws 410, 411 on the latch assembly 406 are disengaged from the knob bracket 405, thereby permitting the user to detach and remove the armor panel 401 from the frame 403 of the vehicle or other structure. The latch assemblies 406 each also include a spring-loaded release 412 disposed between the jaws 410, 411. The spring-loaded release 412 is configured to alternately move the jaws 410, 411 between the open and closed positions, as described in more detail below.

To removably attach the armor panel 401 illustrated in FIG. 5 to the frame 403 of the vehicle or other structure, the knob brackets 405 are first coupled to the frame 403 surrounding the window 404 by any suitable means, such as, for instance, mechanical fastening, welding, bonding, or any combination thereof. The armor panel 401 is then positioned such that the knobs 409 on the free ends of the knob brackets 405 press against the spring-loaded releases 412 on the latch assemblies 406. As the knobs 409 press against the spring-loaded releases 412, the jaws 410, 411 are configured to move into the closed position and clamp around the knobs 409 on the knob brackets 405.

To detach the armor panel 401 from the frame 403 of the vehicle or other structure, the user presses (arrow 413) the armor panel 401 outward (i.e., toward the window 404) such that the knobs 409 on the free ends of the knob brackets 405 press against the spring-loaded releases 412 on the latch assemblies 406. As the knobs 409 press against the spring-loaded releases 412, the jaws 410, 411 on the latch assemblies 406 move into the open position (shown in dashed lines in FIG. 5) and disengage the knobs 409. The user may then detach the armor panel 401 from the frame 403 of the vehicle or other structure by pulling the armor panel 401 away from the window 404. In one embodiment, the knob brackets 406 of the push-to-open grab latches 402 remain affixed to the frame 403 of the vehicle or other structure, which facilitates rapid reinstallation of the ballistics-grade armor panel 401 in the manner described above. In one or more alternate embodiments, the knob brackets 405 may be detached from the frame 403 of the vehicle or other structure and used, for instance, in another vehicle or structure.

Additionally, in the embodiment illustrated in FIG. 5, the armor panel 401 is configured to be released from the frame 403 only by pressing (arrow 413) the armor panel 401 in a direction opposite to the direction of the force imparted on the armor panel 401 by a ballistic strike (i.e., the armor panel 401 is configured to be detached by pressing the armor panel 401 outward toward the window 404, whereas ballistic projectiles may strike an outer strike face 414 of the armor panel 401, thereby imparting an inward force on the armor panel 401). Accordingly, the push-to-open grab latches 402 are configured not to move into the open, detached position when the outer strike surface 414 of the armor panel 401 is struck by a projectile. Otherwise, the armor panel 401 might become inadvertently detached from the frame 403 on the vehicle or other structure during a ballistic strike, which may compromise the safety of individuals inside the vehicle or other structure.

With reference now to FIG. 6, a modular armor system 500 according to another embodiment of the present disclosure is configured to be detachably coupled to a windshield 501 of a vehicle 502 (e.g., an armored vehicle). In the illustrated embodiment, the modular armor system 500 is configured to protect the windshield 501 against damage from foreign object debris ("F.O.D."), such as, for instance, a rock or other debris (e.g., loose fasteners on the ground). For instance, when the vehicle 500 is travelling in a convoy over rough terrain, vehicles in front of the vehicle 500 will tend to propel F.O.D. (e.g., rocks) at a high rate of speed toward the trailing vehicle's windshield 501. The modular armor system 500 is configured to protect the windshield 501 of the vehicle 502 against such impacts, thereby avoiding the costs and time associated with replacing the vehicle's windshield 501.

With continued reference to the embodiment illustrated in FIG. 6, the modular armor system 500 includes a transparent armor panel 503 having an outer strike surface 504 and an inner surface 505 opposite the outer strike surface 504. The modular armor system 500 also includes at least one attachment mechanism configured to detachably couple the transparent armor panel 503 to the vehicle 502. In the illustrated embodiment, the attachment mechanism includes a hook or loop fastening mechanism 506 bonded to the inner surface 505 of the armor panel 503 with a layer of adhesive 507. The adhesive layer 507 may be any suitable type of adhesive, such as, for instance, a thermoplastic or thermoset material (e.g., an aliphatic polyurethane sheet). The thermoplastic or thermoset adhesive layer 507 is configured to laminate the hook or loop fastening mechanism 506 to the ballistic-grade armor panel 503 when subject to elevated temperatures and pressures in an autoclave lamination process or any other suitable process. Although in the illustrated embodiment the hook or loop fastening mechanism 506 extends completely around a periphery of the inner surface 505 of the armor panel 503, in one or more alternate embodiments, the hook or loop fastening mechanism 506 may be located any other suitable location or locations on the armor panel 503 and/or may be a plurality of discrete hook or loop fastening mechanisms 506, rather than a single, continuous hook or loop fastening mechanism 506.

The hook or loop fastening mechanism 506 on the armor panel 503 is configured to be detachably coupled to a corresponding loop or hook mechanism 508 coupled to the vehicle. In the illustrated embodiment, the corresponding loop or hook mechanism 508 coupled to the vehicle 502 extends around an outer periphery of each of the vehicle's windshields 501. For instance, in one embodiment, the corresponding loop or hook mechanism 508 is coupled to metallic retainer frames surrounding the windshields 501. In one or more alternate embodiments, the corresponding loop or hook mechanism 508 may be directly coupled to the windshields 501 of the vehicle 502. The corresponding loop or hook mechanism 508 may be coupled to the vehicle 502 (e.g., the vehicle's windshields 501 or the retainer frames surrounding the windshields 501) by any suitable mechanism, such as, for instance, with a layer of adhesive and/or with mechanical fasteners. The engagement between the hook and loop fastening mechanisms 506, 508 on the transparent armor panel 503 and the vehicle 502 is configured to facilitate removal of the armor panel 503 from the vehicle 502, such as, for instance, when the vehicle 502 is not in use or when the vehicle 502 does not require protection against F.O.D. strikes. In one embodiment, the hook and loop type fastening mechanisms 506, 508 may be the same or similar the hook and loop fastening members 18, 20 described above with reference to the embodiment illustrated in FIGS. 1A and 1B.

In the illustrated embodiment, the armor panel 503 is a rectangular prism having a pair of opposing sides 509, 510 and a pair of opposing upper and lower sides 511, 512, although in one or more alternate embodiments the armor panel 503 may have any other suitable shape. Additionally, in the illustrated embodiment, the shape of the armor panels 503 may match or substantially match the shape of the windshields 501 on the vehicle 502. Accordingly, in one embodiment, when the modular armor systems 500 are coupled to the vehicle 502, the transparent armor panels 503 cover all or substantially all of the windshields 501 of the vehicle 502. In one or more alternate embodiments, the transparent armor panel 503 may have any other suitable shape depending, for instance, on the shape of the windshields 501 of the vehicle 502. In one or more alternate embodiments, the armor panels 503 may not match the shape and/or size of the windshields 501 of the vehicle 502. Additionally, in one embodiment, when the modular armor systems 500 are coupled to the vehicle 502, the inner surfaces 505 of the transparent armor panels 503 may contact outer surfaces 513 of the windshields 501 or may be spaced apart from the outer surfaces 513 of the windshields 501.

The transparent armor panel 503 may be composed of any suitable material configured to absorb and/or deflect the kinetic energy associated with a F.O.D. strike, such as, for instance, glass, interlayer, acrylic, polycarbonate, transparent plastic, transparent ceramic, ionomers, ionoplasts, or any combinations thereof. In one embodiment, the transparent armor panel 503 may be a transparent plastic available from PPG Industries, Inc. under the trade name Opticor™. In one embodiment, the transparent armor panel 503 may be formed from any transparent and generally craze-resistant material. Additionally, the armor panel 503 may have any suitable thickness T depending on the desired ballistics protection rating of the modular armor system 500. For instance, in one embodiment, the thickness T of the armor panel 503 may be from approximately 0.060 inch to approximately 0.37 inch. In another embodiment, the thickness T of the armor panel 503 may be from approximately 0.060 inch to approximately 0.137 inch. In one embodiment, the thickness T of the armor panel 503 may be from approximately 0.122 inch to approximately 0.37 inch. Additionally, the material and thickness T of the transparent armor panel 503 may be selected such that the transparent armor panel 503 is configured to satisfy any desired ballistics protection standard, such as, for instance, one or more ballistics standards promulgated by NIJ, HOSDB, STANAG, UL, EuroNorm, VPAM, or any custom level of ballistics protection.

Embodiments of the transparent armor panel 503 of the present disclosure were tested in accordance with ballistics standard ATPD 2352T. In one embodiment, an armor panel 503 composed of transparent plastic having a thickness T ranging from approximately 0.122 inch to approximately 0.37 inch, a width W of approximately 6 inches, and a height H of approximately 6 inches, withstood eleven impacts in the same or substantially the same location from a 12 mm SiN ball traveling at a velocity ranging from approximately 106 feet per second (fps) and approximately 153 fps. An embodiment of the armor panel 503 composed of transparent plastic having a thickness T of approximately 0.060 inch, a width W of approximately 6 inches, and a height H of approximately 6 inches, withstood eleven impacts in the same or substantially the same location from a 12 mm SiN ball traveling at a velocity ranging from approximately 106 fps and approximately 125 fps.

In one embodiment, the modular armor system 500 may include a high-modulus thermoplastic polyurethane (TPU) layer coupled to the inner surface 505 of the armor panel 503. In one embodiment, when the modular armor system 500 is detachably coupled to the vehicle 502, the TPU layer abuts or contacts the outer surfaces 513 of the windshields 501 of the vehicle 502. The contact between the windshields 501 and the TPU layers on the modular armor systems 500 is configured to mitigate optical distortions (e.g., haloing) due to the presence of the transparent armor panel 503. The TPU layer may be coupled to the armor panel 503 by subjecting the TPU layer and the armor panel 503 to an elevated temperature and pressure in an autoclave lamination process or any other suitable process. In another embodiment, the armor panel 503 may be pre-laminated with the TPU layer.

Although in the illustrated embodiment the modular armor system 500 includes corresponding hook and loop type fastening mechanisms 506, 508 for detachably coupling the armor panel 503 to the vehicle 502, in one or more alternate embodiments, the modular armor system 500 may include any other suitable type of mechanisms for detachably coupling the armor panel 503 to the vehicle 502, such as, for instance, one or more mechanisms that are the same or similar to one of the quick-release mechanisms 211, 302 described above with reference to the embodiments illustrated in FIGS. 3A, 3B, and 4.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," and "above," and similar terms have been used herein to describe a spatial relationship of one element to another, it is understood that these terms are intended to encompass different orientations of the various elements and components of the device in addition to the orientation depicted in the figures.

What is claimed is:

1. A modular armor system, comprising:
a ballistics-grade armor panel for providing ballistics protection, said ballistics-grade armor panel having an outer strike face and an inner surface opposite the outer strike face, at least a majority of said ballistic-grade armor panel being solid from the strike face to the inner surface said ballistics-grade armor panel comprising a perimetral portion on the outer strike face or the inner surface extending radially to a periphery of said ballistics-grade armor panel, said periphery comprising a first side opposite a second side, a third side opposite a fourth side, wherein the third and fourth sides are between said first and second sides, and wherein the first, second, third and fourth sides bound said ballistic grade armor panel, said perimetral portion comprising a first section adjacent the first side, a second section adjacent the second side, a third section adjacent the third side, and a fourth section adjacent the fourth side; and
at least one hook or loop fastening member connected to the first and second sections of the perimetral portion of the ballistics-grade armor panel for detachably coupling the ballistics-grade armor panel to a structure with the perimetral portion facing the structure, wherein a material of the ballistics-grade armor panel is selected from the group of transparent materials consisting of glass, interlayer, acrylic, polycarbonate, plastic, transparent ceramic, ionomers, ionoplasts, and any combinations thereof.

2. The modular armor system of claim 1, wherein the structure comprises a frame surrounding a window in a vehicle or building.

3. The modular armor system of claim 1, further comprising a step in the ballistics-grade armor panel extending inward from the outer strike face, and wherein the at least one hook or loop fastening member comprises a plurality of hook or loop fastening tabs coupled to the step.

4. The modular armor system of claim 1, wherein the ballistics-grade armor panel has a ballistics rating of NIJ Level IIIA.

5. The modular armor system of claim 1, wherein the at least one hook or loop fastening member is connected to the ballistics-grade armor panel by a layer of adhesive.

6. The modular armor system of claim 5, wherein the layer of adhesive comprises polyurethane.

7. The modular armor system of claim 1, wherein the at least one hook or loop fastening member is adhered to the strike face of the ballistics-grade armor panel in a direction as defined from the strike surface toward the inner face.

8. The modular armor system of claim 1, wherein the at least one hook or loop fastening member is adhered to the perimetral portion using an adhesive having a tensile strength of at least 3500 psi.

9. The modular armor system of claim 1, wherein said at least one hook or loop fastening member is connected to each of the first, second, third and fourth sections of the perimetral portion of the ballistics-grade armor panel for detachably coupling the ballistics-grade armor panel to a structure.

10. The modular armor system of claim 9, wherein a separate hook or loop fastening member is connected to each of the first, second, third and fourth sections of the perimetral portion.

11. The modular armor system of claim 1, wherein said at least one loop or hook fastening member extends along a major portion of a perimeter of said ballistics-grade armor panel.

12. The modular armor system of claim 1, comprising a plurality of separate and spaced apart hook or loop fastening members connected to at least one of said first, second, third and fourth sections.

13. The modular armor system of claim 1, wherein a plurality of separate and spaced apart hook or loop fastening members are connected to each of the first, second, third and fourth sections.

14. A modular armor system, comprising:
a ballistics-grade armor panel for providing ballistics protection, said ballistics-grade armor panel having an outer strike face and an inner surface opposite the outer strike face, the ballistics-grade armor panel providing ballistics protection and comprising a perimetral portion on the strike face extending radially to a periphery of said ballistics-grade armor panel, said periphery comprising a first side opposite a second side, a third side opposite a fourth side, wherein the third and fourth sides are between said first and second sides, and where the first, second, third and fourth sides bound said ballistics-grade armor panel, said perimetral portion comprising a first section adjacent the first side, a second section adjacent the second side, a third section adjacent the third side, and a fourth section adjacent the fourth side;
at least one hook or loop fastening member connected to the first and second sections of the perimetral portion of the ballistics-grade armor panel for detachably coupling the ballistics-grade armor panel to a structure member with the perimetral portion of the strike face facing the structure; and
a step in the ballistics-grade armor panel extending inward from the outer strike face, and wherein the at least one hook or loop fastening member comprises a plurality of hook or loop fastening tabs coupled to the step.

15. The modular armor of claim 14, wherein a material of the ballistics-grade armor panel is selected from the group of transparent materials consisting of glass, interlayer, acrylic, polycarbonate, plastic, transparent ceramic, ionomers, ionoplasts, and any combination thereof.

16. The modular armor of claim 14, wherein a material of the ballistics-grade armor panel is selected from the group of opaque materials consisting of metal, alloys, ceramic, composite, synthetic fibers, and any combinations thereof.

17. The modular armor of claim 14, wherein the ballistics-grade armor panel has a ballistics rating of NIJ Level IIIA.

18. The modular armor of claim 14, wherein said at least one hook or loop fastening member is connected to each of the first, second, third and fourth sections of the perimetral portion of the ballistics-grace armor panel for detachably coupling the ballistics-grade armor panel to a structure.

19. The modular armor of claim 14, wherein a separate hook or loop fastening member is connected to each of the first, second, third and fourth sections of the perimetral portion.

20. The modular armor of claim 14, wherein said at least one hook or loop fastening member extends along a major portion of a perimeter of said ballistics-grade armor panel.

21. The modular armor of claim 14, comprising a plurality of separate and spaced apart hook or loop fastening members connected to at least one of said first, second, third and fourth sections.

22. The modular armor of claim 14, wherein a plurality of separate and spaced apart hook or loop fastening members are connected to each of the first, second, third and fourth sections.

23. The modular armor of claim 14, wherein the at least one hook or loop fastening member is connected to the ballistics-grade armor panel by a layer of adhesive.

24. The modular armor of claim 23, wherein the layer of adhesive comprises polyurethane.

25. A modular armor system, comprising:
a ballistics-grade armor panel for providing ballistics protection, said ballistics-grade armor panel having an outer strike face and an, inner surface opposite the outer strike face, at least a majority of said ballistic-grade armor panel being solid from the strike face to the inner surface, said ballistics-grade armor panel comprising a perimetral portion on the outer strike face or the inner surface extending radially to a periphery of said ballistics-grade armor panel, said periphery comprising a first side opposite a second side, a third side opposite a fourth side, wherein the third and fourth sides are between said first and second sides, and wherein the first, second, third and fourth sides bound said ballistic grade armor panel, said perimetral portion comprising a first section adjacent the first side, a second section adjacent the second side, a third section adjacent the third side, and a fourth section adjacent the fourth side;
a step in the ballistics-grade armor panel extending inward from the outer strike face; and
at least one hook or loop fastening member connected to the first and second sections of the perimetral portion of the ballistics-grade armor panel for detachably coupling the ballistics-grade armor panel to a structure with the perimetral portion facing the structure, and wherein the at least one hook or loop fastening member is connected to the step.

26. The modular armor system of claim 25, wherein the at least on hook or loop fastening member comprises a plurality of hook or loop fastening tabs connected to the step.

27. The modular armor system of claim 25, wherein the structure comprises a frame surrounding a window in a vehicle or building.

28. The modular armor system of claim 25, wherein a material of the ballistics-grade armor panel is selected from the group of transparent materials consisting of glass, interlayer, acrylic, polycarbonate, plastic, transparent ceramic, ionomers, ionoplasts, and any combinations thereof.

29. The modular armor system of claim 25, wherein a material of the ballistics-grade armor panel is selected from the group of opaque materials consisting of metal alloys, ceramic, composite, synthetic fibers, and any combinations thereof.

30. The modular armor system of claim 25, wherein the ballistics-grade armor panel has a ballistics rating of NIJ Level IIIA.

31. The modular armor system of claim 25, wherein the at least one hook or loop fastening member is adhered to the strike face of the ballistics-grade armor panel.

32. The modular armor system of claim 25, wherein the at least one hook or loop fastening member is adhered to the perimetral portion using an adhesive having a tensile strength of at least 3500 psi.

33. The modular armor system of claim 25, wherein said at least one hook or loop fastening member is connected to each of the first, second, third and fourth sections of the perimetral portion of the ballistics-grade armor panel for detachably coupling the ballistics-grade armor panel to a structure.

* * * * *